(12) United States Patent
Kitamura

(10) Patent No.: US 7,286,601 B2
(45) Date of Patent: Oct. 23, 2007

(54) DIGITAL BROADCAST SYSTEM HAVING TRANSMISSION APPARATUS AND RECEIVING APPARATUS

(75) Inventor: Tomohiko Kitamura, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 677 days.

(21) Appl. No.: 10/641,360

(22) Filed: Aug. 14, 2003

(65) Prior Publication Data

US 2004/0105505 A1 Jun. 3, 2004

(30) Foreign Application Priority Data

Aug. 27, 2002 (JP) .............................. 2002-247695

(51) Int. Cl.
*H04L 27/00* (2006.01)
(52) U.S. Cl. ..................................... 375/259; 704/503
(58) Field of Classification Search ................ 375/259; 704/205, 503
See application file for complete search history.

(56) References Cited

U.S. PATENT DOCUMENTS

| | | | | |
|---|---|---|---|---|
| 5,272,528 | A * | 12/1993 | Juri et al. ................. | 375/240.2 |
| 5,721,584 | A * | 2/1998 | Yoshinobu et al. .......... | 725/114 |
| 5,886,276 | A * | 3/1999 | Levine et al. ................... | 84/603 |
| 6,115,688 | A * | 9/2000 | Brandenburg et al. ...... | 704/503 |
| 6,182,031 | B1 * | 1/2001 | Kidder et al. ................ | 704/205 |
| 6,842,724 | B1 * | 1/2005 | Lou et al. ....................... | 703/6 |

FOREIGN PATENT DOCUMENTS

| | | |
|---|---|---|
| EP | 0 692 910 | 1/1996 |
| EP | 1 041 766 | 10/2000 |
| EP | 1 043 877 | 10/2000 |
| JP | 06334573 | 2/1994 |
| WO | WO 97/14229 | 4/1997 |

OTHER PUBLICATIONS

Brian W. Kroeger et al., "Robust IBOC DAB AM and FM Technology for digital audio broadcasting (URL)", Annual Broadcast Engineering Conference, NAB, Apr. 1997, Las Vegas, Nevada, US.
Cupo et al., "An OFDM All Digital In-Band-On-Channel (IBOC) AM and FM Radio Solution Using the Pac Encoder" IEEE Transactions on Broadcasting, IEEE, Inc. New York, US, vol. 44, No. 1, Mar. 1998, pp. 22-27.

* cited by examiner

*Primary Examiner*—Mohammed Ghayour
*Assistant Examiner*—Juan Alberto Torres

(57) ABSTRACT

A broadcast system has digital receiving apparatuses that imitate deteriorated reproduction that is observed in analog receiving apparatuses when a transmission path failure occurs, thus preventing the audiences, who are accustomed to the analog broadcasting, from sensing discomfort at the digital broadcasting. A transmission apparatus causes encoding units 11 and 12 to generate low- and high-quality streams based on the same contents, and transmits these streams onto a transmission path while delaying the high-quality stream. In the receiving apparatuses, a reproduction unit 25 reproduces the high-quality stream in a normal state, while packets of the low-quality stream received during a time period T until the current time are accumulated in an accumulation unit 22. If a transmission path failure occurs, a reproduction control unit 26 causes the reproduction unit 25 to reproduce, instead of the high-quality stream, the accumulated packets of the low-quality stream.

25 Claims, 16 Drawing Sheets

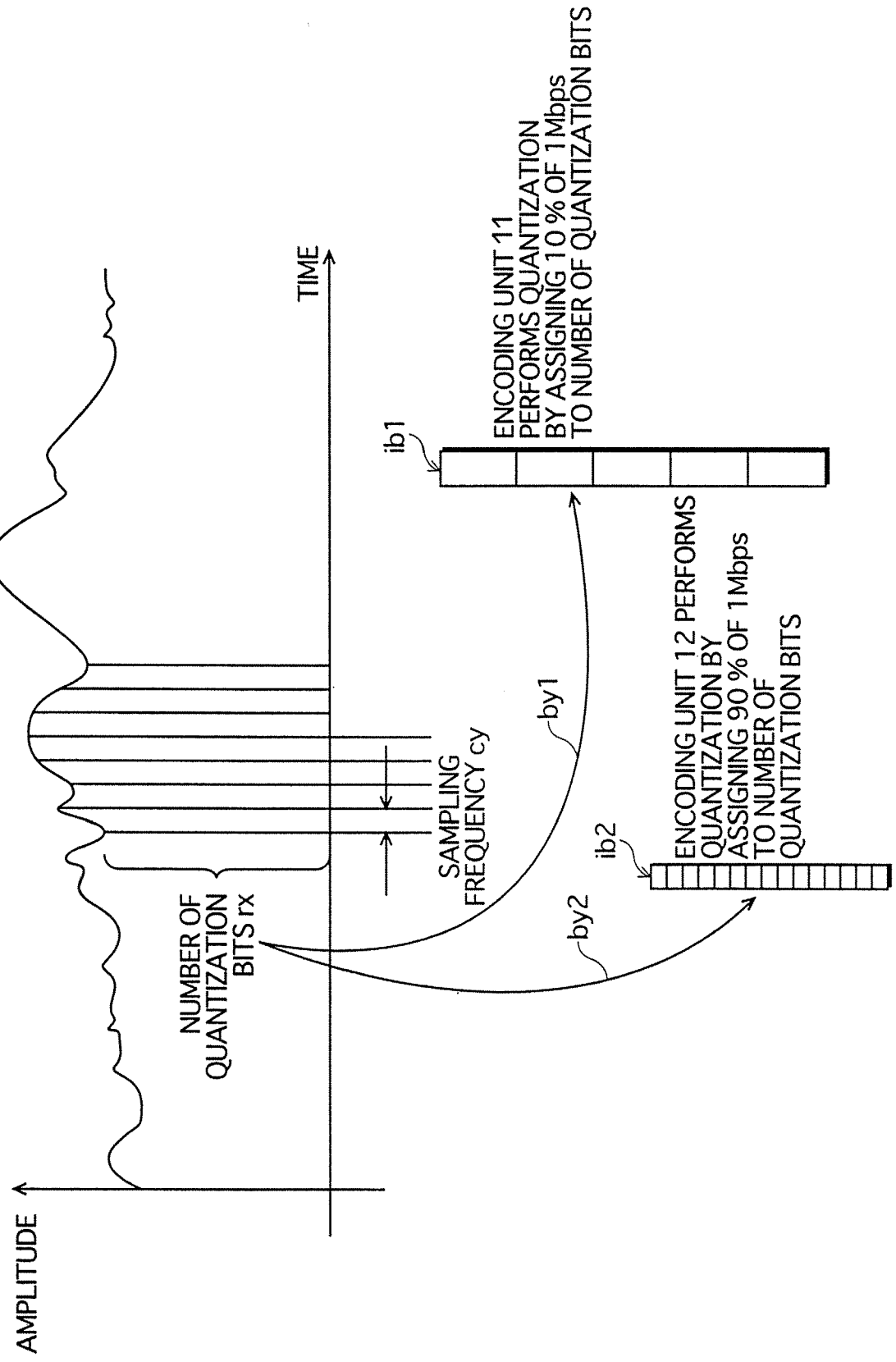

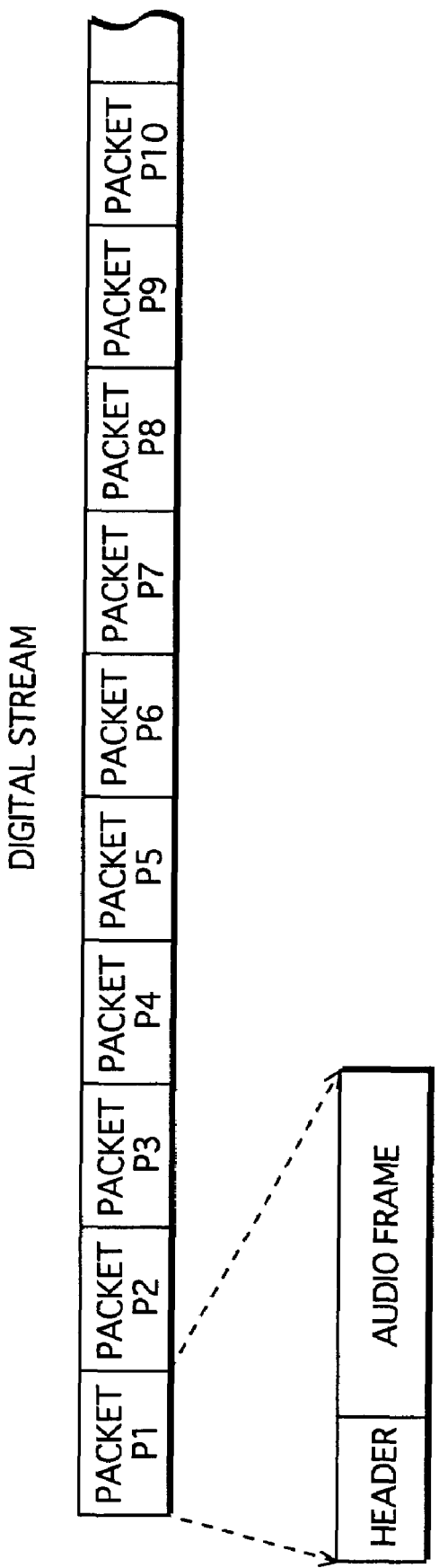

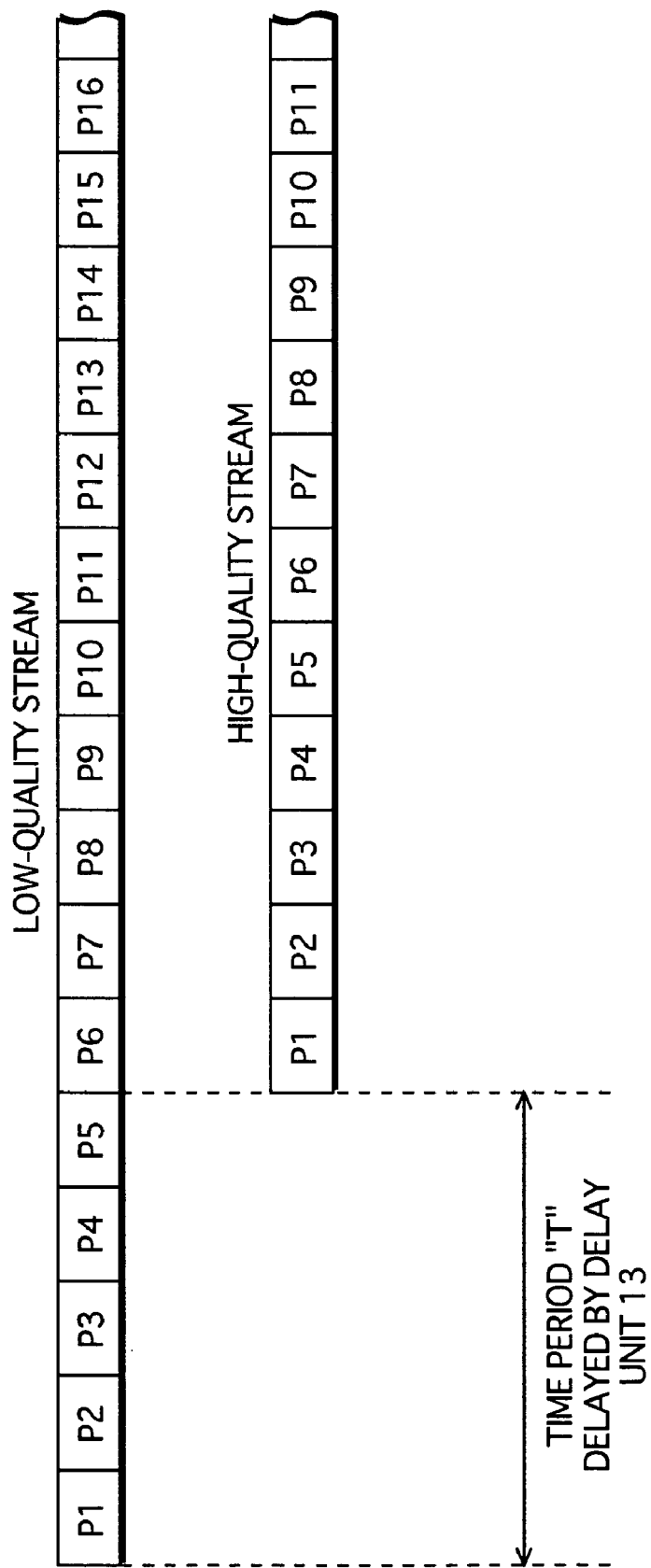

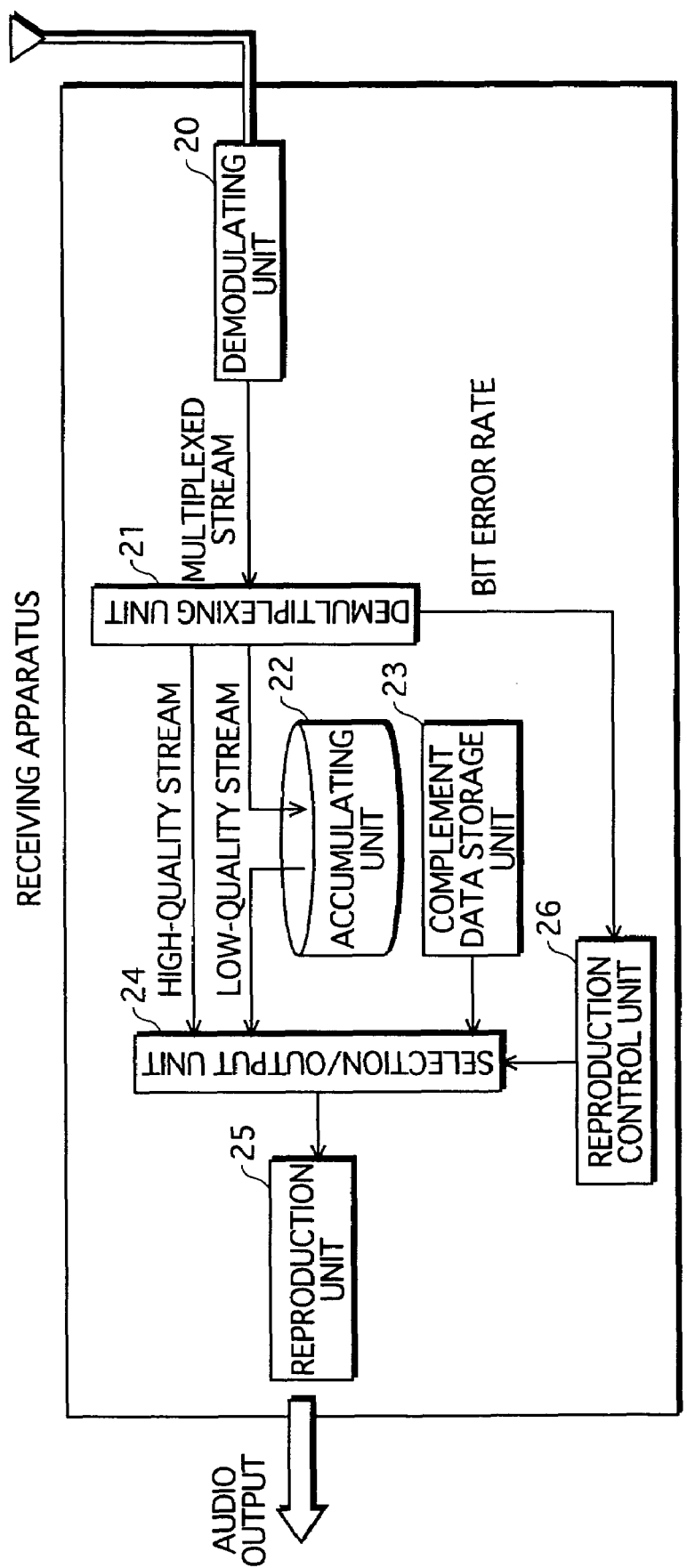

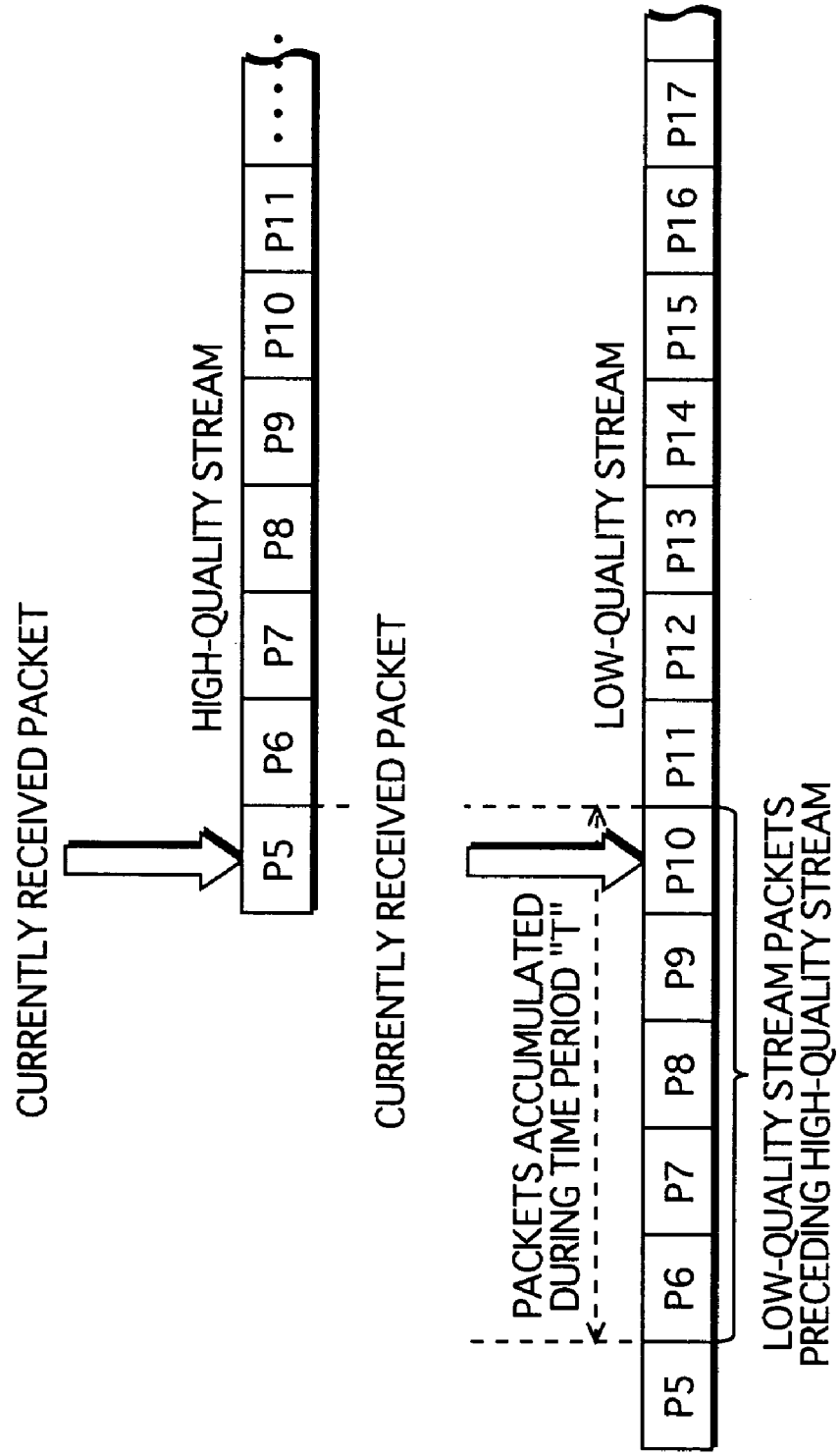

DIGITAL BROADCAST SYSTEM HAVING TRANSMISSION APPARATUS AND RECEIVING APPARATUS

BACKGROUND OF THE INVENTION (1) Field of the Invention

The present invention relates to a broadcast system having a transmission apparatus and receiving apparatuses, specifically to improvements in digital broadcast services.

(2) Description of the Related Art

In recent years, the infrastructure for the shift from analog broadcasting to digital broadcasting has been improved steadily. In this improvement of the infrastructure, it is important to fully recognize the differences between the analog broadcasting and the digital broadcasting. One of such differences is observed when a transmission path failure occurs.

In the analog broadcasting, when a transmission path failure occurs, the failure is recognized by the audiences as deteriorated reproduction quality. Experiencing more than 50 years of operation of analog broadcasting, the audiences are familiar with such deteriorated reproduction quality that is caused by a thunderstorm or the like.

On the other hand, in digital broadcasting, a transmission path failure causes receiving apparatuses to detect a bit error. When they detect a bit error in a received broadcast wave, the receiving apparatuses correct the bit error using Reed-Solomon parity codes or the like before supplying reproduction output. With these operations, the audiences are supplied with reproduction outputs not deteriorated by the bit error. However, the receiving apparatuses stop supplying the reproduction outputs if a thunderstorm or the like causes a large amount of bit error that cannot be corrected by a bit error correction. It should be noted here that in the present document, a "digital broadcast failure" indicates a large failure that cannot be overcome by a bit error correction.

Meanwhile, the common knowledge: "when a transmission path failure occurs, the failure is recognized by the audiences as deteriorated reproduction quality" may become an unexpected obstacle in digital broadcasting. That is to say, for example, if a sudden thunderstorm occurs while a user is supplied with a reproduction output, the user will probably expect deterioration in the reproduction quality due to the above-mentioned common knowledge that has taken root. However, if supply of reproduction output from a receiving apparatus suddenly stops against this expectation due to a transmission path failure, the user may mistake the transmission path failure for a receiving apparatus failure. In such circumstances, there is a possibility that a flood of complaints about a receiving apparatus failure are sent to the maker of the receiving apparatus each time a thunderstorm or the like causes a lot of transmission path failures. In such a case, the maker will be tied up with dealing with the complaints.

SUMMARY OF THE INVENTION

The object of the present invention is therefore to provide a broadcast system having digital receiving apparatuses that imitate deterioration of reproduction output that is observed in the analog receiving apparatuses when a transmission path failure occurs, thus preventing the audiences from mistaking a transmission path failure for a receiving apparatus failure.

The above object is fulfilled by a broadcast system including a transmission apparatus and a receiving apparatus, the transmission apparatus including: a generating unit operable to generate a first digital stream and a second digital stream by encoding a same signal at different encoding bit rates, where an encoding bit rate for the first digital stream is lower than an encoding bit rate for the second digital stream; and a transmission unit operable to transmit the first and second digital streams onto a transmission path while delaying the second digital stream relative to the first digital stream, the receiving apparatus including: a reproduction unit operable to reproduce the second digital stream in a normal state; and a reproduction control unit operable to, if a transmission path failure occurs, cause there production unit to reproduce, instead of the second digital stream, a portion of the first digital stream that has been received before the occurrence of the transmission path failure.

With the above-stated construction, the transmission apparatus transmits the low-quality stream preceding the high-quality stream. The receiving apparatus reproduces the high-quality stream in a normal state, but if a transmission path failure occurs, reproduces a portion of the low-quality stream that has been received prior to and has the same contents as a portion of the high-quality stream that should have been reproduced if the transmission path failure had not occurred. With this arrangement, the audience would fail to recognize that the reproduction has been suspended.

Also, by reproducing the low-quality stream in place of the high-quality stream during the reception-interrupted period, the receiving apparatus imitates deteriorated reproduction that has been observed long in analog receiving apparatuses when a transmission path failure occurs, thus preventing the audiences, who are accustomed to the analog broadcasting, from sensing discomfort at the digital broadcasting.

In the above broadcast system, the receiving apparatus may superpose a signal resembling a noise on the one or more packets accumulated in the accumulating unit when the one or more packets are reproduced due to occurrence of a transmission path failure.

With the above-stated construction, the digital receiving apparatus can reproduce a digital stream with which a white noise is mixed in imitation of a degraded reproduction of analog receiving apparatuses. This realistic imitation prevents the audiences, who are accustomed to the analog broadcasting, from sensing discomfort at the digital broadcasting.

In the above broadcast system, the receiving apparatus may be provided with a pilot lamp that emits light in a manner in which a normal state is distinguished from an abnormal state, wherein in the normal state, the second digital stream is reproduced, and in the abnormal state, the first digital stream is reproduced.

With the above-stated construction, the digital receiving apparatus can reproduce a digital stream with blinking of the pilot lamp, which is familiar to the audiences of analog receiving apparatuses. This realistic imitation prevents the audiences, who are accustomed to the analog broadcasting, from sensing discomfort at the digital broadcasting.

In the above broadcast system, the receiving apparatus may further include: an operation receiving unit operable to receive input of an operation by a user to request real time reproduction; and a switch unit operable to switch from reproduction of the second digital stream to reproduction of the first digital stream if the operation receiving unit receives the input of the operation by the user.

The above-stated construction provides a practical advantage. For example, suppose a user is watching a real sports game while listening to the live broadcasting of the sports game with a portable-type receiving apparatus. The user can select either the high-quality stream which is provided with delay or the low-quality stream which is provided without delay. This function facilitates the user since he/she can select the reproduction of the low-quality stream and enjoy watching the game without being confused by the time lag between the real game and the broadcast of the game.

In the above broadcast system, the generating unit of the transmission apparatus may include two encoders that respectively generate the first digital stream and the second digital stream by performing a variable-length encoding onto an analog signal.

With the above-stated construction in which the generating unit performs a variable-length encoding onto an analog signal, as much amount of bit rate as omitted from the audio frames that contain less amounts of audible component can be appropriated to the audio frames that contain more amounts of audible component. This enables the quality of the audio reproduction to be improved in total.

The above objects are also fulfilled by a broadcast system including a transmission apparatus and a receiving apparatus, the transmission apparatus including: a generating unit operable to generate a first digital stream, a second digital stream, and a third digital stream by encoding a same signal respectively at different encoding bit rates, where an encoding bit rate for the first digital stream is the lowest among the encoding bits rates, an encoding bit rate for the second digital stream is the middle between encoding bit rates for the first and third digital streams, and an encoding bit rate for the third digital stream is the highest among the encoding bits rates; and a transmission unit operable to transmit the first, second, and third digital streams onto a transmission path while delaying the second digital stream by time period T1 and delaying the third digital stream by time period T2, wherein T2 > T1, the receiving apparatus including: an accumulating unit operable to accumulate part of the first and second digital streams received from the transmission apparatus; a reproduction unit operable to reproduce the third digital stream in a normal state; and a reproduction control unit operable to cause the reproduction unit to reproduce, instead of the third digital stream, the part of the second digital stream accumulated in the accumulating unit if a transmission path failure continues for the time period T2 or more, and to reproduce the part of the first digital stream accumulated in the accumulating unit following the reproduction of the part of the second digital stream accumulated in the accumulating unit.

With the above-stated construction, in the normal reception period, data is reproduced with a quality level that is proportionate to 85% of the bit rate, and in the reception-interrupted period, first, data is reproduced with a quality level that is proportionate to 10%, and then with a quality level that is proportionate to 5% of the bit rate. This would give an impression to the audiences that the reproduction quality is gradually deteriorated, making them feel as if they were listening to an analog receiver.

The above objects are also fulfilled by a broadcast system including a transmission apparatus and a receiving apparatus, the transmission apparatus including: a first generating unit operable to generate a first audio stream and a second audio stream by encoding a same signal at different encoding bit rates, where an encoding bit rate for the first audio stream is lower than an encoding bit rate for the second audio stream; a second generating unit operable to generate a first video stream and a second video stream by encoding a same signal at different encoding bit rates, where an encoding bit rate for the first video stream is lower than an encoding bit rate for the second video stream; and a transmission unit operable to transmit the first and second audio streams and the first and second video streams onto a transmission path while delaying the second video stream by a time period T1 and delaying the second audio stream by a time period T2, wherein T2 > T1, the receiving apparatus including: a first accumulating unit operable to accumulate part of the first video stream received during the time period T1 until a current time; a second accumulating unit operable to accumulate part of the first audio stream received during the time period T2 until the current time; a reproduction unit operable to reproduce the second video stream and the second audio stream in a normal state; and a reproduction control unit operable to cause the reproduction unit to reproduce (i) the part of the first video stream accumulated in the first accumulating unit and (ii) the part of the first audio stream accumulated in the second accumulating unit for the time period T1 if a transmission path failure continues for the time period T2 or more, and to reproduce, after the time period T1, the part of the first audio stream accumulated in the second accumulating unit.

With the above-stated construction, the "high-quality audio+high-quality video" output that is supplied during the normal reception period changes to the "low-quality audio+low-quality video" output if a failure occurs to the transmission path. Furthermore, if the time reception interruption continues for a certain time period, the reproduction changes from "audio+video" to "only audio". That is to say, the reproduced data changes step by step from the high-quality audio and video in the normal reception period to the low-quality audio and video, and to the only audio without video. In this way, the digital receiving apparatuses imitate the gradual deterioration of reproduction output that is observed in the analog receiving apparatuses when a transmission path failure occurs, giving an impression to the audiences that the reproduction quality is gradually degraded in the same manner as when they are listening to analog receivers.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2 shows encoding procedures performed by the encoding units 11 and 12;

FIG. 3 shows the structure of the digital stream generated by the encoding unit 11;

FIG. 4 shows how the high-quality stream is delayed by the delay unit 13 with reference to the low-quality stream;

FIG. 5 shows the construction of the receiving apparatuses;

FIG. 6 shows the portion of the low-quality stream that is accumulated in the accumulating unit 22;

DESCRIPTION OF THE PREFERRED EMBODIMENT

The following describes a broadcast system according to preferred embodiments of the present invention.

Embodiment 1

Figure 1:
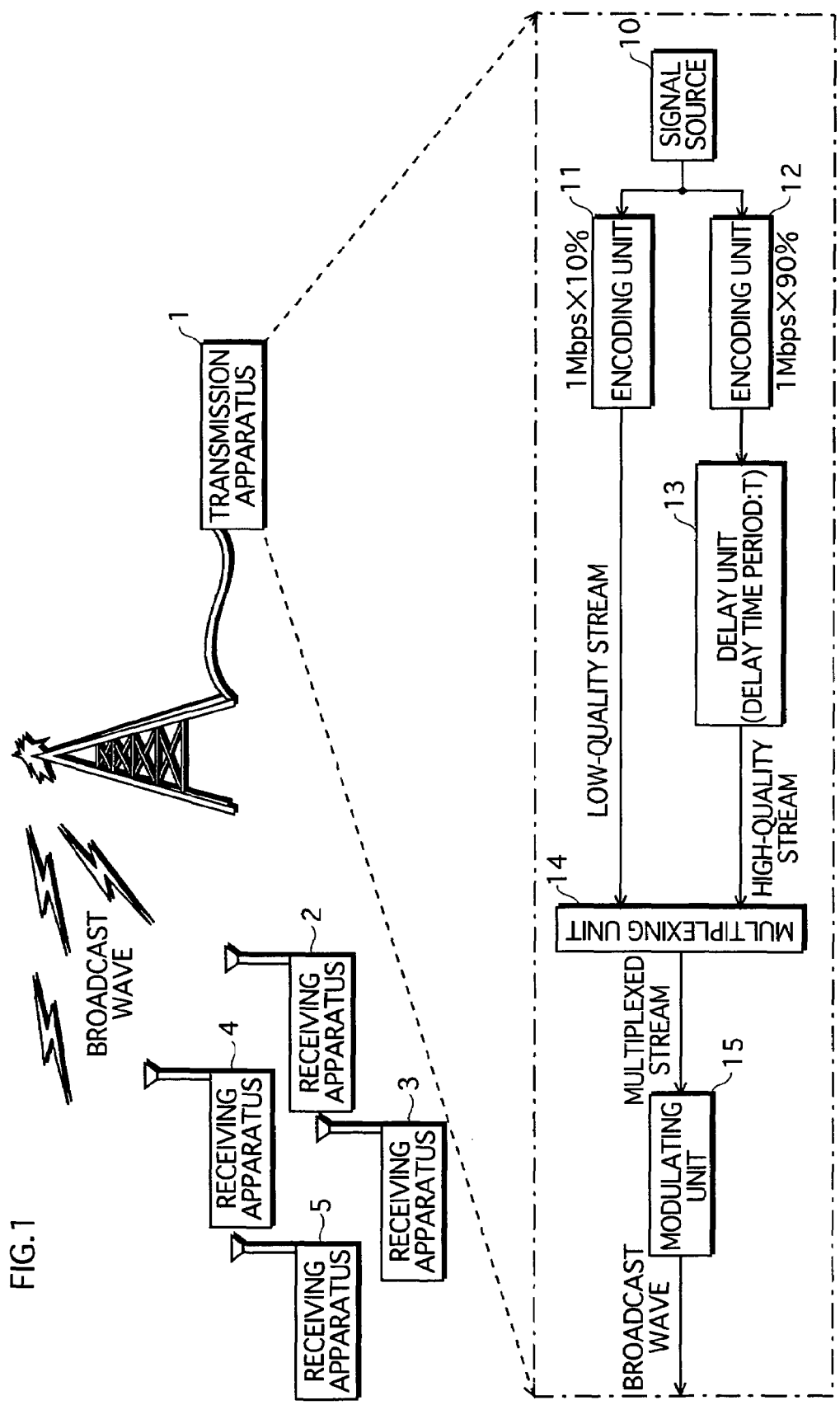
FIG. 1 shows the construction of a broadcast system in Embodiment 1 of the present invention.

FIG. 1 shows the construction of a broadcast system in Embodiment 1 of the present invention. In FIG. 1, the broadcast system includes a digital transmission apparatus 1 and digital receiving apparatuses 2-5, and provides a digital broadcast service. It should be noted here that the present embodiment deals with a terrestrial digital radio broadcasting.

The transmission apparatus 1 transmits a digital stream using a band for digital broadcasting. The band for digital broadcasting can be identified by a time slot in a radio frequency band. It is supposed here that a bit rate of 1 Mbps is assigned to the band.

The receiving apparatuses 2-5 are digital receiving apparatuses that have been developed to replace existent analog radio receiving apparatuses. There are portable and stationary types of digital receiving apparatuses, and both types receive the digital streams from the transmission apparatus and reproduce them.

Now, the construction of the transmission apparatus for use in the broadcast system outlined above will be described with reference to FIG. 1. As shown in FIG. 1, the transmission apparatus 1 includes a signal source 10, an encoding unit 11, an encoding unit 12, a delay unit 13, a multiplexing unit 14, and a modulating unit 15.

The signal source 10 receives audio signals from a sound recording apparatus in a broadcast station and/or a reproduction apparatus for reproducing analog audio signals recorded on tape, and outputs analog signals.

The encoding unit 11 encodes the analog signals output from the signal source 10 into a first type of digital stream. FIG. 2 shows encoding procedures performed by the encoding units 11 and 12. The upper portion of FIG. 2 is a graph showing change with time in the analog signals output from the signal source 10.

First, the encoding unit 11 samples the amplitude of the analog signals output from the signal source 10, with a predetermined sampling frequency "cy". The amplitude obtained by the sampling is represented by the number of quantization bits "rx". This encoding process outputs audio frames. The audio frame is the smallest unit of digital audio data, and has a time period (for example, an order of 20 milliseconds) that corresponds to the inverse of the sampling frequency. By repeating this encoding process while analog signals are output from the signal source 10, a digital stream composed of a sequence of audio frames is obtained. FIG. 3 shows the structure of the digital stream generated by the encoding unit 11. The digital stream includes a header and at least one audio frame. The header includes a packet identifier for identifying a packet that is currently received among those included in a digital stream. The encoding unit 11 encodes the received analog signal by obtaining the number of quantization bits at 10% of 1 Mbps of bit rate assigned to one band. A bit rate is assigned to each type of digital stream by taking the transmission on a transmission path into account. It should be noted here that 1 Mbps of bit rate is only an example, and the bit rate may be different from this.

The encoding unit 12 encodes the analog signals output from the signal source 10 into a second type of digital stream. In this encoding, the encoding unit 12 assigns 90% of the bit rate for one band to the second type of digital stream. The second type of digital stream has higher quality than the first type of digital streams due to a great difference between the bit rates. The arrows "by1" and "by2" in FIG. 2 indicate the encoding processes performed by the encoding units 11 and 12, respectively. The indicators "ib1" and "ib2" indicate "density" of the first and second types of digital streams, which results from the bit rates assigned by the encoding units 11 and 12, respectively. As the indicators indicate, the encoding unit 12 encodes analog signals with a lot of quantization bits, thus providing a high quality. For this reason, the second type of digital stream obtained by the encoding unit 12 is referred to as a high-quality stream, and the first type of digital stream obtained by the encoding unit 11 is referred to as a low-quality stream.

The delay unit 13 delays the high-quality stream generated by the encoding unit 12, by a time period T. FIG. 4 shows how the high-quality stream is delayed relative to the low-quality stream by the delay unit 13. Both low-quality and high-quality streams area sequence of packets to which identifiers P1, P2, ... are assigned. As indicated by FIG. 4, the first packet P1 of the high-quality stream is provided together with packet P6 of the low-quality stream after the delay unit 13 delays the high-quality stream by time period T.

The multiplexing unit 14 multiplexes the low-quality stream generated by the encoding unit 11 and the high-quality stream generated by the encoding unit 12 and delayed by the delay unit 13, into a multiplexed stream.

The modulating unit 15 modulates the multiplexed stream, and transmits a broadcast wave obtained as a result of the modulation onto a transmission path using one band for digital broadcasting.

Now, the receiving apparatuses will be described. FIG. 5 shows the construction of the receiving apparatuses. As shown in FIG. 5, each receiving apparatus includes a demodulating unit 20, a demultiplexing unit 21, an accumulating unit 22, a complement data storage unit 23, a selection/output unit 24, a reproduction unit 25, and a reproduction control unit 26.

The demodulating unit 20 demodulates a broadcast wave received via the transmission path, performs an error correction onto the demodulated broadcast wave to obtain a multiplexed stream, and outputs the obtained multiplexed stream to the demultiplexing unit 21.

The demultiplexing unit 21 performs an error correction onto the multiplexed stream output from the demodulating unit 20, and demultiplexes the multiplexed stream into a high-quality stream and a low-quality stream. The demultiplexing unit 21 performs the error correction by calculating a bit error rate in the multiplexed stream, and judges whether the bit error rate exceeds a predetermined standard value, and if the judgment is positive, notifying the reproduction control unit 26 of the fact. The standard value used in the judgment is an acceptable limit within which the bit error can be corrected through an error correction. The notification that the bit error rate has exceeded the predetermined standard value indicates that the bit error found in the multiplexed stream cannot be corrected, and that the demultiplexing unit 21 has stopped execution of the demultiplexing process. The reproduction control unit 26 monitors how long the demultiplexing unit 21 stops execution of the demultiplexing process, and recognizes the time period detected by the monitoring as a reception-interrupted period. Conversely, a time period during which the digital streams are received normally is referred to as a normal reception period.

The accumulating unit 22 is a buffer memory in which part of the low-quality stream obtained by the demultiplexing is accumulated. The accumulating unit 22 accumulates a portion of the low-quality stream that corresponds to a time period T in the past up to the current time. In the present embodiment, the time period T is equal to the delay time T.

FIG. 6 shows the portion of the low-quality stream that is accumulated in the accumulating unit 22. It is supposed here that among the packets in the low-quality stream, packet P10 was received most recently, and packets P6 to P10 received during the time period T are accumulated in the accumulating unit 22. It should be noted here that each receiving apparatus keeps receiving a new packet, and packets received during the time period T until the current time are always accumulated in the accumulating unit 22.

Figure 7A:
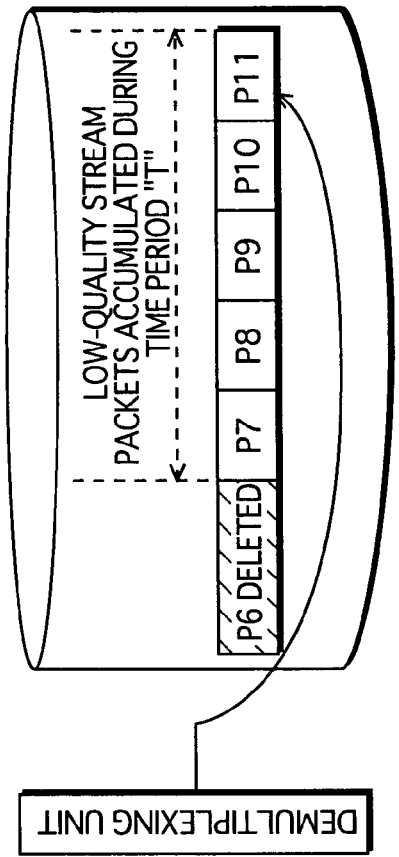
FIGS. 7A to 7D shows how packets are written (accumulated) into the accumulating unit 22.
Figure 7B:
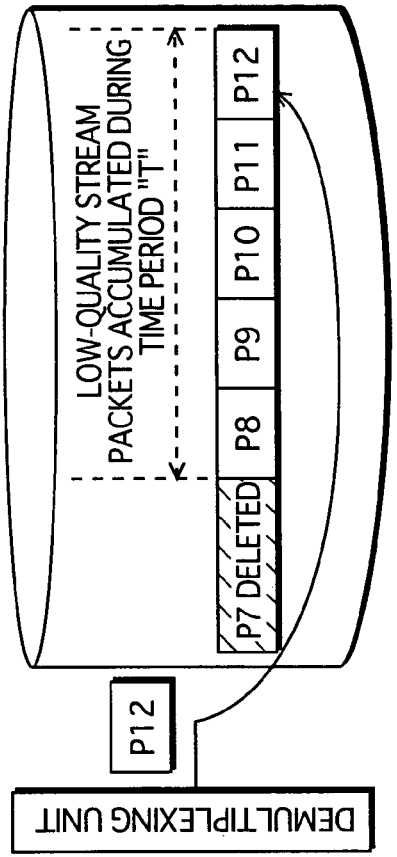
Figure 7C:
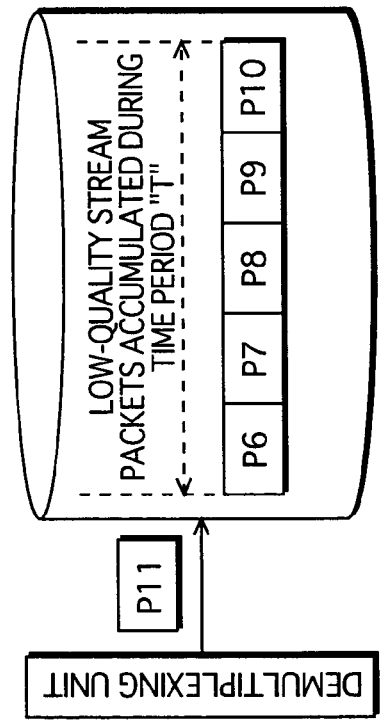
Figure 7D:
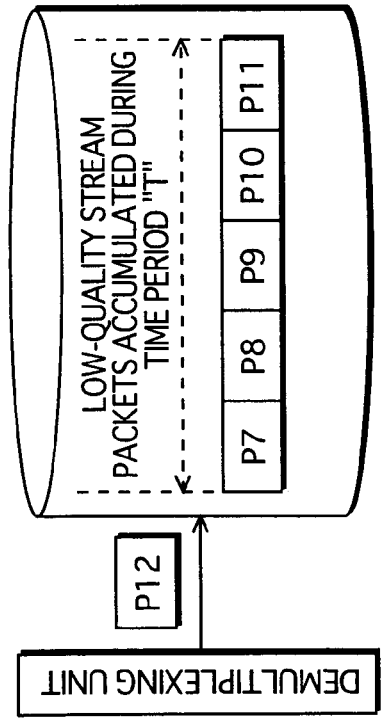

FIGS. 7A to 7D shows how packets are written (accumulated) into the accumulating unit 22. FIG. 7A indicates that packet P11 is received newly when packets P6 to P10 have been accumulated in the accumulating unit 22. FIG. 7B indicates that the oldest packet P6 is deleted and the newly received packet P11 is written into the accumulating unit 22. This applies to the case where packet P12 is received. FIG. 7C, indicates that packet P12 is received newly when packets P7 to P11 have been accumulated in the accumulating unit 22. FIG. 7D indicates that the oldest packet P7 is deleted and the newly received packet P12 is written into the accumulating unit 22.

The above-described procedures are repeated and most recently received packets during the time period T are always accumulated in the accumulating unit 22. The capacity of the accumulating unit 22 is set to "time period T×1 Mbps×10%". The accumulating unit 22 keeps on accumulating part of the low-quality stream as long as the low-quality stream is received normally. The accumulating unit 22 does not accumulate the low-quality stream when the low-quality stream is not received, namely in the reception-interrupted period.

It should be noted here that in the present embodiment, the time period T is equal to the delay time T for the sake of convenience, but in realty, the two time periods may differ from each other.

The complement data storage unit 23 stores complement data realized by supplementary audio data that is used to complement the stopped reproduction during the reception-interrupted period. The supplementary audio data is an announcement of the fact that the reproduction output has been stopped due to deteriorated condition of the transmission path.

The selection/output unit 24 selects one from: (a) a high-quality stream; (b) part of the low-quality stream accumulated in the accumulating unit 22; and (c) audio data stored in the complement data storage unit 23, and outputs the selected one to the reproduction unit 25. The selection and output is performed by the selection/output unit 24 in accordance with instructions sent from the reproduction control unit 26.

The reproduction unit 25 reproduces the digital stream selectively output from the selection/output unit 24. Since the digital stream dealt with in the present embodiment is audio data, the reproduction unit 25 supplies audio outputs. When the part of the low-quality stream accumulated in the accumulating unit 22 is reproduced by the reproduction unit 25, the quality of the reproduced audio is low since only 10% of the bit rate is assigned to the low-quality stream.

The reproduction control unit 26 instructs the selection/output unit 24 to select and output the high-quality stream while the multiplexed stream is received normally. The reproduction control unit 26 instructs the selection/output unit 24 to select and output the part of the low-quality stream accumulated in the accumulating unit 22 when it is notified from the demultiplexing unit 21 of occurrence of a reception interruption. That is to say, the part of the low-quality stream accumulated in the accumulating unit 22 is output during the reception-interrupted period.

Figure 8:
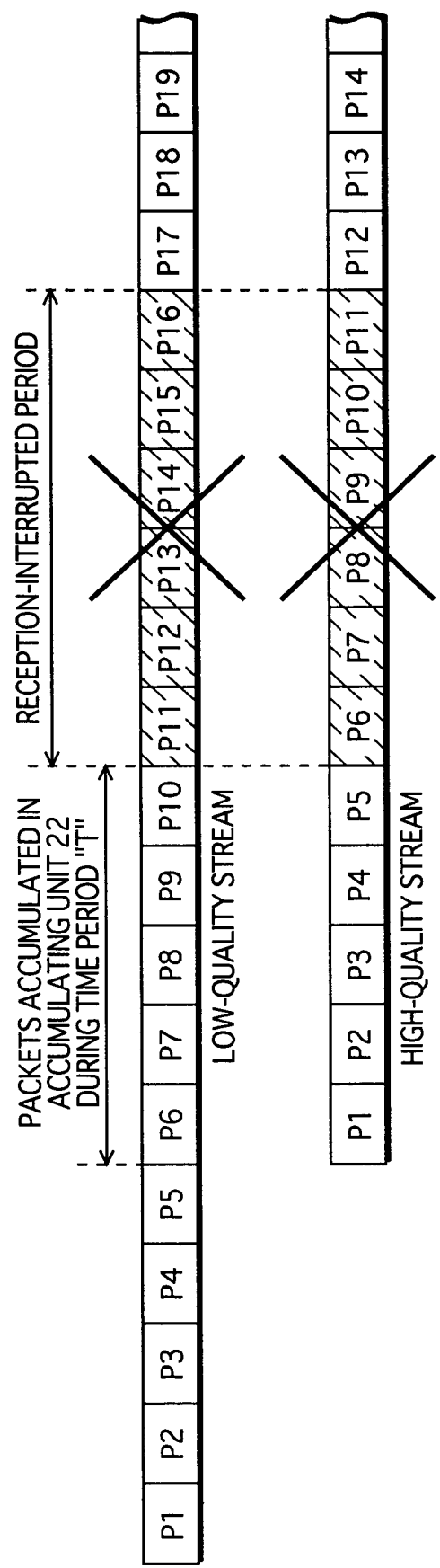
FIG. 8 shows reproduction control performed by the reproduction control unit 26.

FIG. 8 shows reproduction control performed by the reproduction control unit 26. During the reception-interrupted period shown in FIG. 8, packets P11 to P16 of the low-quality stream and packets P6 to P11 of the high-quality stream are expected to be received. It is supposed here that it is inevitable that some packets drop out from both the high-quality and low-quality streams due to the reception interruption.

On the other hand, the accumulating unit 22 has accumulated packets of the low-quality stream during the time period T immediately before the start of the reception-interrupted period. In this example shown in FIG. 8, the accumulating unit 22 has accumulated packets P6 to P10 of the low-quality stream during the period. This is because as explained earlier, the reception of the high-quality stream is delayed from the reception of the low-quality stream. With this arrangement, it is possible for the reproduction control unit 26 to instruct the selection/output unit to select and output the packets of the low-quality stream accumulated in the accumulating unit 22 so that packets P6 to P10 of the low-quality stream are reproduced instead of packets P6 to P10 of the high-quality stream during the reception-interrupted period.

As apparent from above, both packets P6 to P10 of the low-quality stream and P6 to P10 of the high-quality stream have been generated from the same source and have the same broadcast contents, but are different in that while 90% of the bit rate for one band for digital broadcasting are assigned to the high-quality stream, 10% of the same bit rate for the band are assigned to the low-quality stream. When reproduced by the reproduction unit 25, the quality of the low-quality stream is lower than that of the high-quality stream, though the broadcast contents are the same. This gives an impression to the audiences that the reproduction quality has been degraded.

Figure 9:
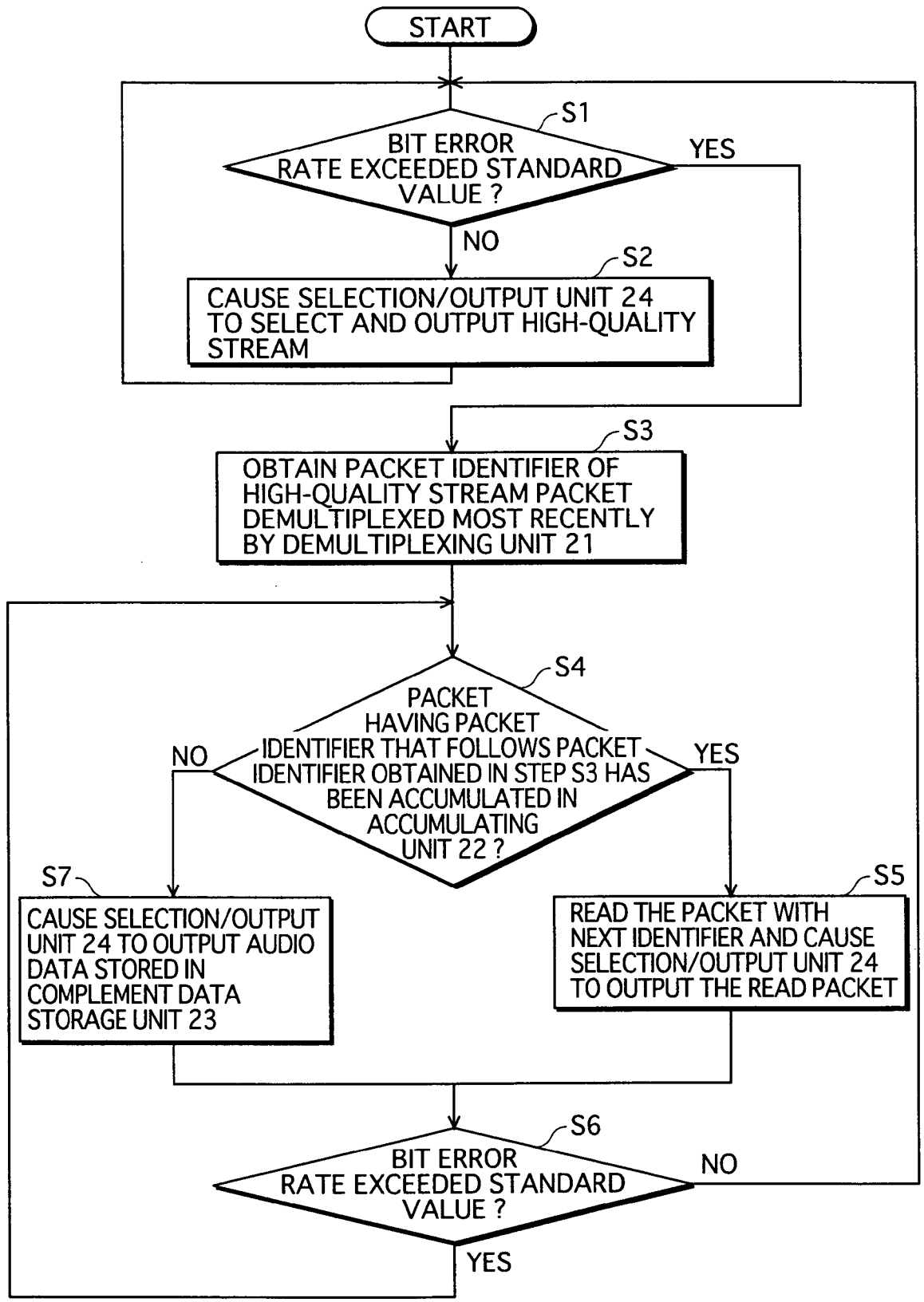
FIG. 9 is a flowchart showing the reproduction control procedures of the reproduction control unit 26.

FIG. 9 is a flowchart showing the reproduction control procedures of the reproduction control unit 26.

The process performed by the reproduction control unit 26 is broadly divided into the process for the normal reception period (steps S1-S2) and the process for the reception-interrupted period (steps S3-S7).

In the normal reception period, the reproduction control unit 26 instructs the selection/output unit 24 to select and output the high-quality stream unless it is notified from the demultiplexing unit 21 that the bit error rate exceeded the standard value (steps S1-S2).

If it is notified from the demultiplexing unit 21 that the bit error rate exceeded the standard value, the reproduction control unit 26 performs the process for the reception-interrupted period, starting with obtaining a packet identifier of a packet of the high-quality stream that has been demultiplexed most recently by the demultiplexing unit 21 (step S3). The reproduction control unit 26 then judges whether a packet having a packet identifier that follows the packet identifier obtained in step S3 has been accumulated in the accumulating unit 22 (step S4). If the judgment result is positive, the reproduction control unit 26 reads the packet from the accumulating unit 22 and instructs the selection/output unit 24 to output the read packet (step S5). The above steps S4-S6 are executed repeatedly during the reception-interrupted period, and the packets accumulated in the accumulating unit 22 are output and reproduced in succession. If the reception-interrupted period is longer than a time required to reproduce the packets accumulated in the accumulating unit 22, it may happen that there is no packet accumulated in the accumulating unit 22 that can be reproduced before the reception-interrupted period ends. In this case, the reproduction control unit 26 instructs the selection/output unit 24 to output the audio data stored in the complement data storage unit 23 (step S7). This enables the audiences to be informed that the reproduction output has been stopped due to deteriorated condition of the transmission path.

As described above, according to the broadcast system in the present embodiment, the low-quality stream is transmitted preceding the high-quality stream by a predetermined time period, and most recently received packets of the low-quality stream during the predetermined time period are always accumulated in the accumulating unit 22. And if a reception interruption occurs, the packets accumulated in the accumulating unit 22 are reproduced. This prevents the audiences from recognizing a suspended reproduction.

With the above-described arrangement in which the digital receiving apparatuses imitate deterioration of reproduction output that is observed in the analog receiving apparatuses when a transmission path failure occurs, it is possible to prevent the audiences, who are familiar with deterioration in reproduction quality in such a case, from being confused by a sudden stop of reproduction supply.

It is preferable that the time period T is determined based on statistics of the reception-interrupted period for the transmission path. This is because with such an arrangement, if a reception interruption occurs, the high-quality stream is delayed by the time period T, packets of the low-quality stream are always accumulated during the time period T until the current time, and the reception-interrupted period lasts for the time period T, thus making it highly possible that the audiences can enjoy seamless reproduction of the broadcasting even during the reception-interrupted period.

In the present embodiment, the high-quality stream and the low-quality stream are multiplexed into one multiplexed stream, which is then transmitted onto a transmission path. However, the high-quality stream and the low-quality stream may be transmitted onto different transmission paths, respectively. For example, the high-quality stream and the low-quality stream may be transmitted onto transmission paths for the radio broadcasting and the cable broadcasting, respectively. In this case, even if a thunderstorm or the like causes a failure on a transmission path for the high-quality stream, the failure does not affect a transmission path for the low-quality stream, and the broadcast is provided without interruption.

Also, in the present embodiment, an audio announcement is provided as the complement data. However, music or an electronic sound may be provided instead of announcement. It is preferred that the music or electronic sound has such a tone as makes the audiences feel alarmed that the transmission path failure might have occurred.

Embodiment 2

Embodiment 2 relates to an improvement of the receiving apparatuses in live broadcasting of a sports game or the like. In Embodiment 1, the receiving apparatuses reproduce delayed high-quality stream during the normal reception period. This means that the audiences listen to the broadcast contents always after a delay of time period T. The audiences do not recognize such a delay when they listen to a pre-recorded broadcast program. However, when the audiences listen to a live broadcast program of a sports game or the like, some problems may occur. For example, suppose a user is watching a real sports game listening to the live broadcasting of the sports game with a portable-type receiving apparatus. The user might be confused by the time lag between the real game and the broadcast of the game, which is caused by the-receiving apparatus reproducing the delayed high-quality stream.

Figure 10:
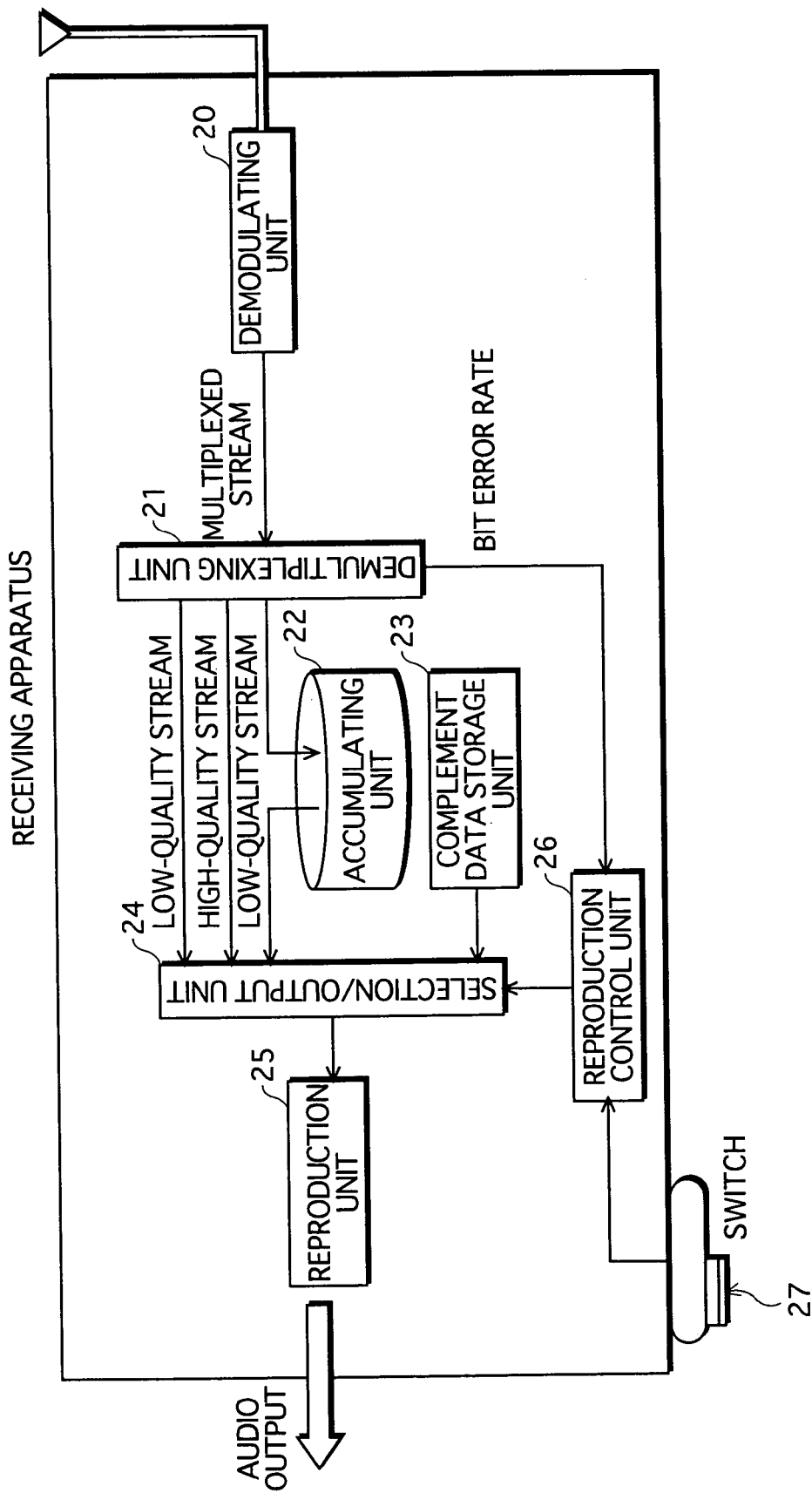
FIG. 10 shows the construction of the receiving apparatuses in Embodiment 2.

The present embodiment provides a method to solve the problem. FIG. 10 shows the construction of the receiving apparatuses in Embodiment 2. The construction resembles the construction shown in FIG. 1, but differs from it in that the demultiplexing unit 21 outputs both the low-quality and high-quality streams directly to the selection/output unit 24, as well as outputting the low-quality stream to the accumulating unit 22. The receiving apparatuses in the present embodiment also include a switch 27 that receives an instruction by the user (audience) to switch between the low- and high-quality streams, and sends the instruction to the selection/output unit 24.

Now, the operation of the receiving apparatuses in the present embodiment will be described.

As described in Embodiment 1, the selection/output unit 24 receives the high-quality stream output from the demultiplexing unit 21 and outputs it to the reproduction unit 25. However, if the user operates the switch 27 to switch from the high-quality stream to low-quality stream, the selection/output unit 24 receives the low-quality stream from the demultiplexing unit 21 and outputs it to the reproduction unit 25.

As described above, audiences can select either the high-quality stream which is provided with delay or the low-quality stream which is provided without delay. This function facilitates the audiences, especially when they are watching a sports game while listening to the broadcast of the game since they can select the reproduction of the low-quality stream and enjoy watching the game without being confused by the time lag between the real game and the broadcast of the game.

Embodiment 3

Figure 11:
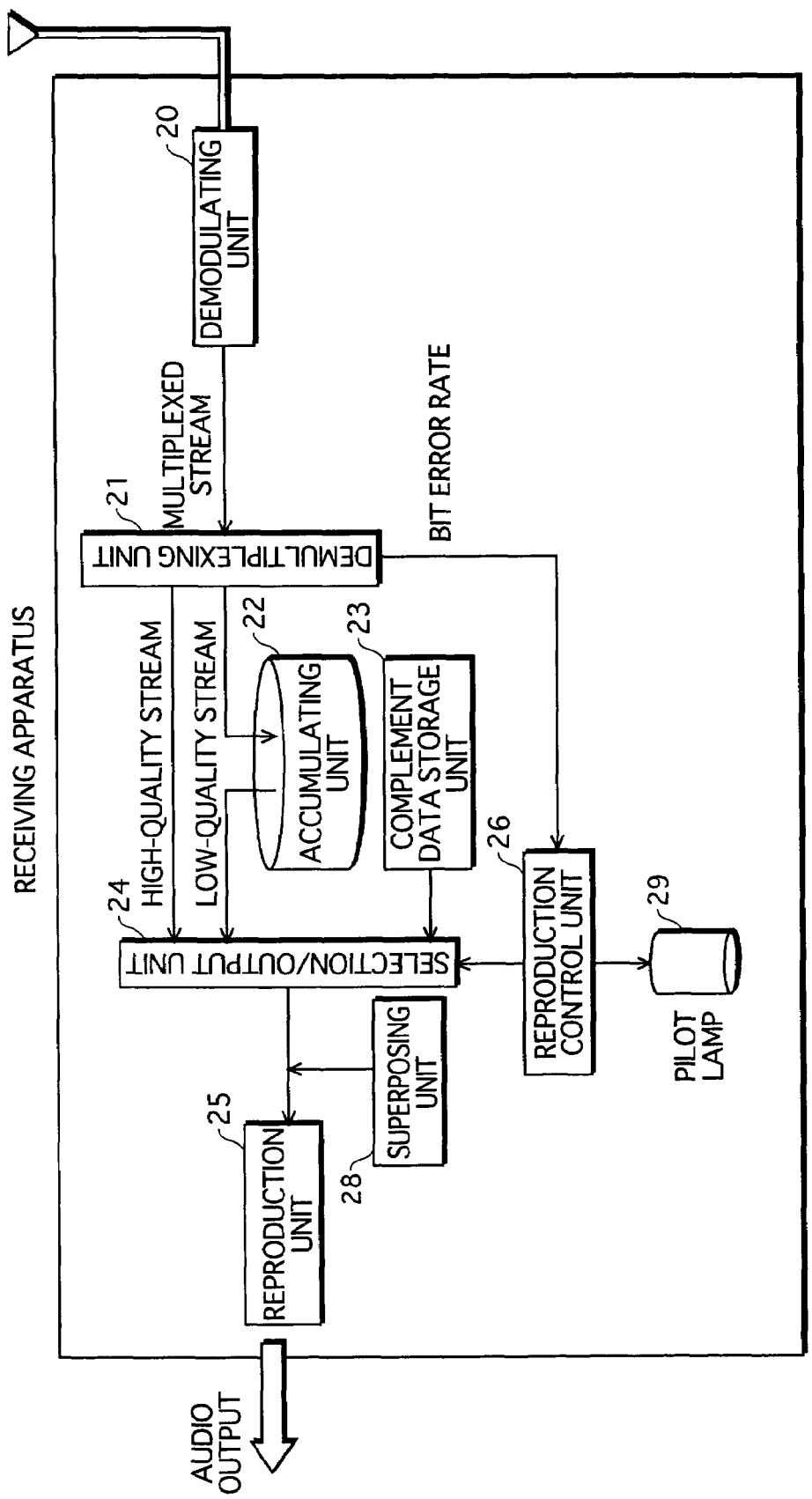
FIG. 11 shows the construction of the receiving apparatuses in Embodiment 3.

In Embodiment 3, the imitation of analog receiving apparatuses by the digital receiving apparatuses in Embodiment 1 is performed in a more realistic manner. FIG. 11 shows the construction of the receiving apparatuses in Embodiment 3.

FIG. 11 differs from FIG. 5 in that it additionally includes a superposing unit 28 and a pilot lamp 29.

The superposing unit 28 superposes a noise signal on the reproduced low-quality stream output from the reproduction unit 25 during the reception-interrupted period. The noise signal has a signal waveform that resembles the white noise. When the noise signal is superposed on the reproduced low-quality stream, the audiences can hear, together with voices/sounds output from the reproduction unit 25, a burst of noise that is familiar to them through analog broadcasting output from analog receiving apparatuses. This may give an impression to the audiences that they are listening to an analog receiving apparatus.

The pilot lamp 29 is a light-emitting element such as a light-emitting diode, where the light emitted from the pilot lamp indicates a state of stream reception. The reproduction control unit 26 controls the pilot lamp 29 for the audiences to visually distinguish the reception-interrupted period from the normal reception period. More specifically, the reproduction control unit 26 causes the pilot lamp 29 to blink stably during the normal reception period, and in contrast, to emit light intermittently on an unstable basis during the reception-interrupted period. This operation is an imitation of the blinking of a pilot lamp that is provided in many analog receiving apparatuses.

As described above, according to the present embodiment, the digital receiving apparatuses imitate the noise and blinking of a pilot lamp which have been familiar to the audiences of analog receiving apparatuses, thus preventing the audiences from sensing discomfort at the digital broadcasting.

Embodiment 4

Figure 12:
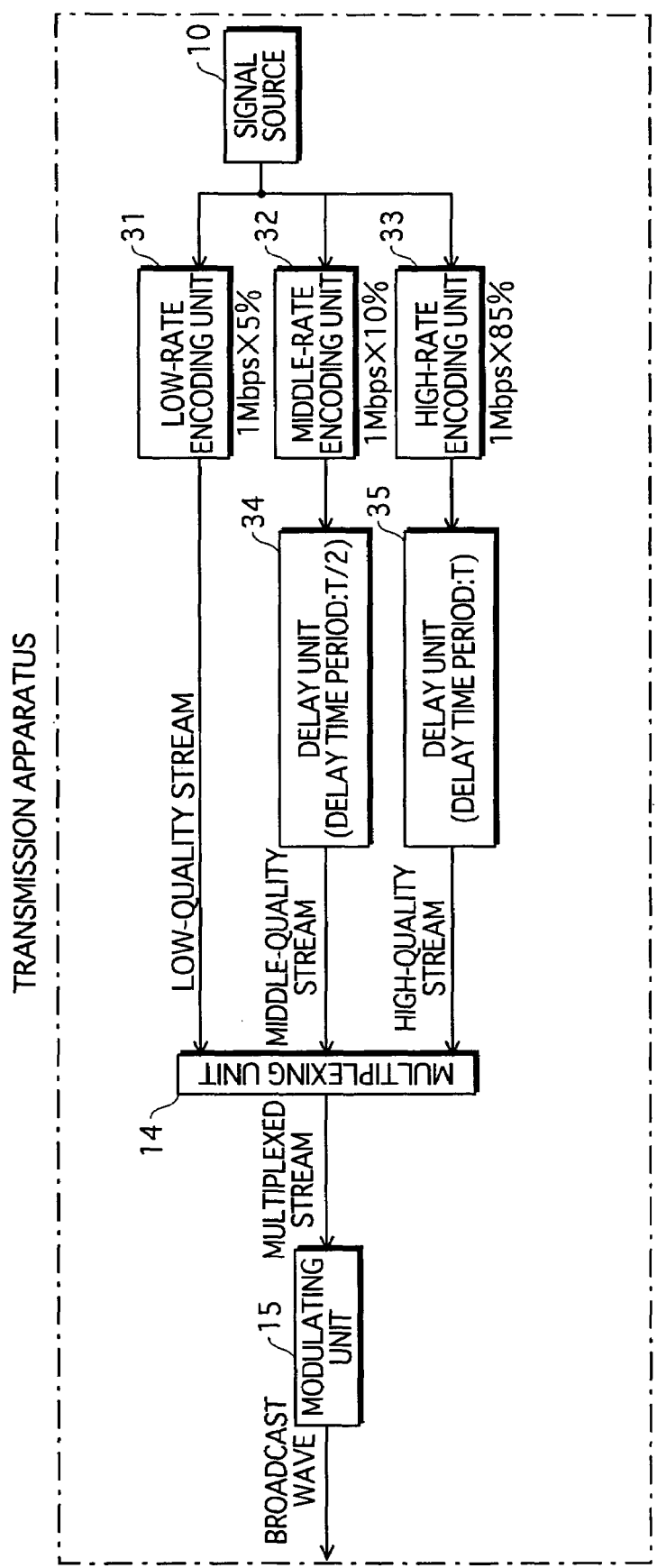
FIG. 12 shows the construction of a transmission apparatus in Embodiment 4.

In Embodiment 1, the low-quality stream and the high-quality stream are transmitted onto a transmission path. In Embodiment 4, n digital streams are transmitted onto a transmission path. FIG. 12 shows the construction of a transmission apparatus in Embodiment 4. In FIG. 12, it is presumed that the number of digital streams "n" is 3. The encoding units 11 and 12 shown in FIG. 1 are replaced with a low-rate encoding unit 31, a middle-rate encoding unit 32, and a high-rate encoding unit 33 in FIG. 12. The encoding units 31-33 encodes analog signals output from the signal source 10. Embodiment 4 differs from Embodiment 1 in the bit rate assigned to each digital stream by each encoding unit. More specifically, in Embodiment 1, the encoding units 11 and 12 assign 10% and 90% of the bit rate for one band to the two types of digital streams, respectively, while in Embodiment 4, the encoding units assign 5%, 10%, and 85% of the bit rate for one band to three types of digital streams, respectively.

The delay unit 13 shown in FIG. 1 is replaced with delay units 34 and 35 in FIG. 12. The delay units 34 and 35 delays digital streams generated by the encoding units 32 and 33, respectively. The delay unit 34 delays digital streams generated by the middle-rate encoding unit 32 by a time period T/2, and outputs the delayed digital streams to the multiplexing unit 14. The delay unit 35 delays digital streams generated by the high-rate encoding unit 33 by a time period T, and outputs the delayed digital streams to the multiplexing unit 14.

With the above-described replacement of components, the multiplexing unit 14 shown in FIG. 12 multiplexes the following three types of digital streams into one multiplexed stream: (1) a digital stream generated by the low-rate encoding unit 31; (2) a digital stream generated by the middle-rate encoding unit 32 and delayed by the delay unit 34 by time period T/2; and (3) a digital stream generated by the high-rate encoding unit 33 and delayed by the delay unit 35 by time period T.

Figure 13:
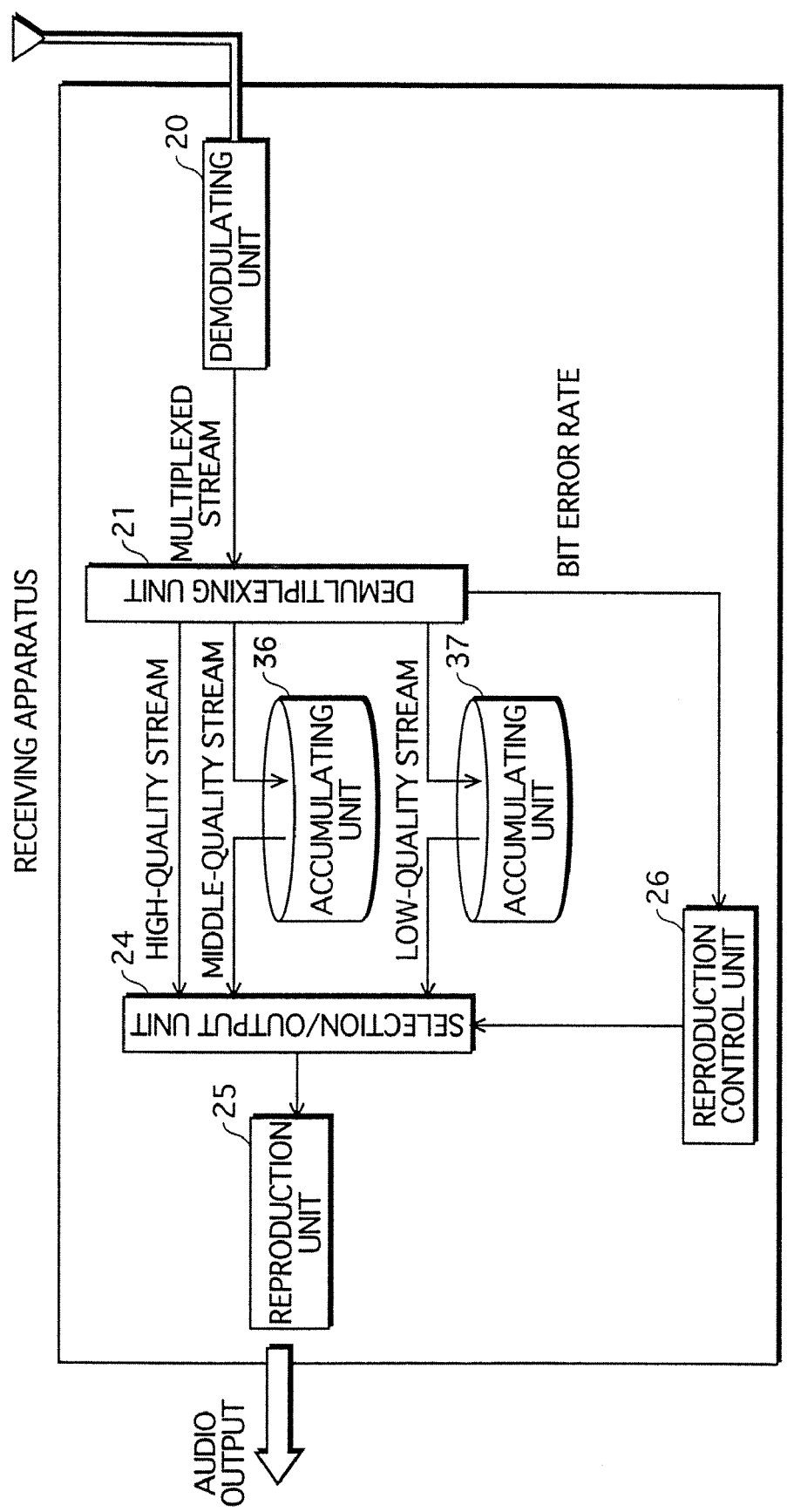
FIG. 13 shows the construction of the receiving apparatuses.

Now, the construction of the receiving apparatuses will be described. FIG. 13 shows the construction of the receiving apparatuses. In FIG. 13, the accumulating unit 22 shown in FIG. 5 has been replaced with accumulating units 36 and 37. The accumulating unit 37 accumulates in itself a low-quality digital stream to which 5% of the bit rate for one band is assigned. The accumulating unit 36 accumulates in itself a middle-quality digital stream to which 10% of the bit rate for one band is assigned and delayed by time period T/2.

In Embodiment 4, the reproduction control unit 26 instructs the selection/output unit 24 to select and output a high-quality digital stream to which 85% of the bit rate for one band is assigned and delayed by time period T in the normal reception period. With this arrangement, the high-quality digital stream is reproduced by the reproduction unit 25 during the normal reception period.

The reproduction control during the reception-interrupted period will be described next. It is presumed here for the sake of convenience that the reception-interrupted period lasts for time period T. During the first half (T/2) of the reception-interrupted period, the reproduction control unit 26 instructs the selection/output unit 24 to output the middle-quality digital stream accumulated in the accumulating unit 36. With this change of outputs, the quality of data reproduced by the reproduction unit 25 is degraded in proportionate to the change from 85% to 10% of the bit rate. During the second half (T/2) of the reception-interrupted period, the reproduction control unit 26 instructs the selection/output unit 24 to output the low-quality digital stream accumulated in the accumulating unit 37. With this change of outputs, the quality of data reproduced by the reproduction unit 25 is degraded in proportionate to the change from 10% to 5% of the bit rate.

As described above, in the present embodiment, in the normal reception period, data is reproduced with a quality level that is proportionate to 85% of the bit rate, and in the reception-interrupted period, first, data is reproduced with a quality level that is proportionate to 10%, and then with a quality level that is proportionate to 5% of the bit rate. This would give an impression to the audiences that the reproduction quality is gradually deteriorated, making them feel as if they were listening to an analog receiver.

It should be noted here that the distribution rate of 85%, 10%, and 5% is only an example, and it may be varied in so far as it gives an impression to the audiences that the reproduction quality is gradually deteriorated.

Embodiment 5

Figure 14:
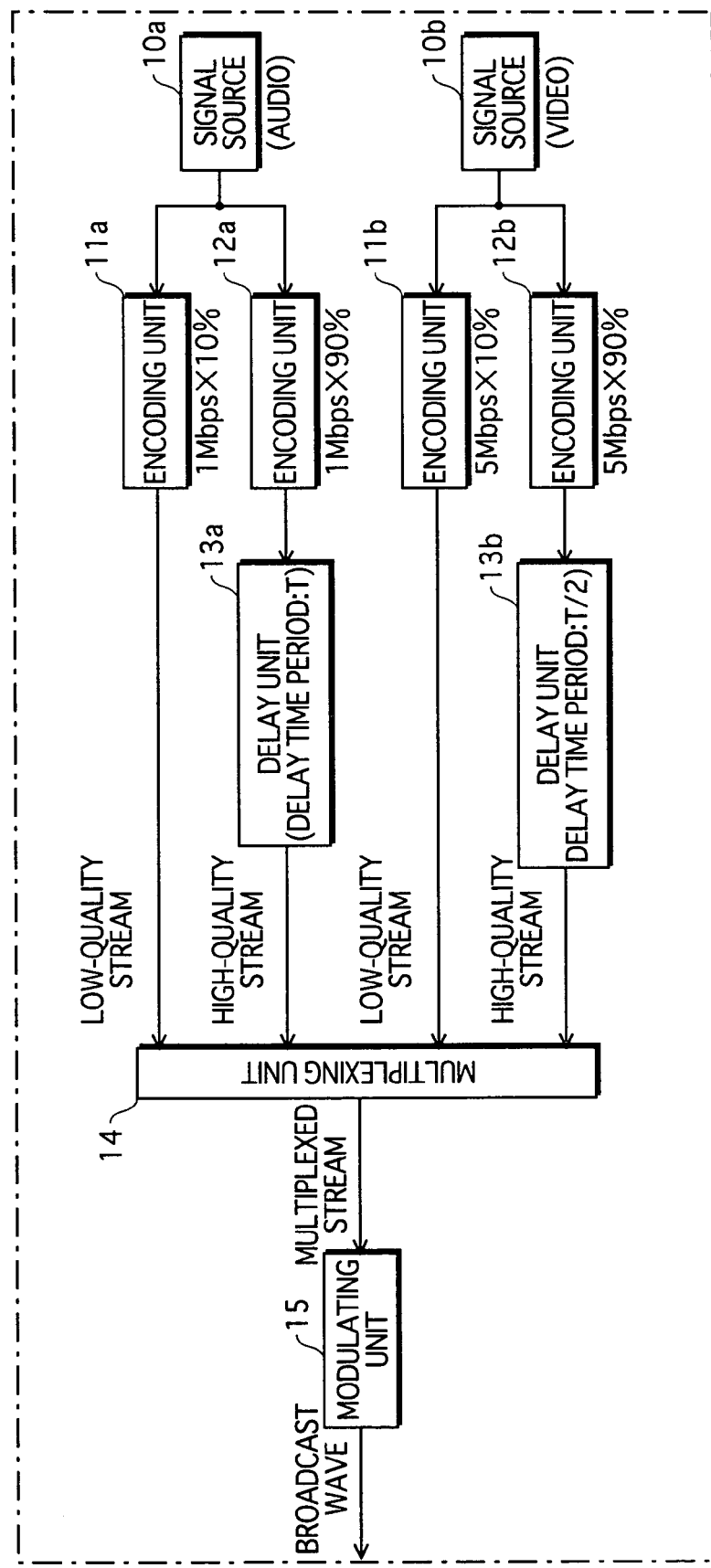
FIG. 14 shows the construction of the broadcast system in Embodiment 5.

In Embodiment 1, only one signal source is provided. In Embodiment 5, different signal sources are provided for video and audio, respectively. FIG. 14 shows the construction of the broadcast system in Embodiment 5. Signal sources 10a and 10b generate audio and video analog signals, respectively. Encoding units 11a and 12a and delay unit 13a are provided in correspondence with the signal source 10a, and encoding units 11b and 12b and delay unit 13b are provided in correspondence with the signal source 10b. With this construction, a low-quality stream and a high-quality stream are generated and the high-quality stream is delayed, for each of the audio and video signals.

Video data requires a higher bit rate in transmission than does audio data. As a result, the encoding unit 11a, 12a, 11b, and 12b assign different bit rates to digital streams, respectively.

As is the case with Embodiment 1, the encoding units 11a and 12a assign 10% and 90% of the bit rate (1 Mbps) for one band to the low- and high-quality streams for audio, respectively. It is supposed here that the bit rate for video data transmission in digital broadcasting is 5 Mbps. The encoding units 11b and 12b assign 10% and 90% of the bit rate (5 Mbps) for one band to the low- and high-quality streams for video, respectively.

That is to say, the encoding by the encoding units 11a, 12a, 11b, and 12b provides: (1) an audio digital stream to which 10% of 1 Mbps is assigned; (2) an audio digital stream to which 90% of 1 Mbps is assigned; (3) a video digital stream to which 10% of 5 Mbps is assigned; and (4) a video digital stream to which 90% of 5 Mbps is assigned. It should be noted here that 5 Mbps for video digital stream is given only as an example, and the bit rate may differ from this.

The delay units 13a and 13b delay the audio and video digital streams, respectively. As is the case with Embodiment 1, the delay unit 13a delays the audio high-quality stream generated by the encoding unit 12a by time period T. The delay unit 13b delays the video high-quality stream generated by the encoding unit 12b by time period T/2. The reason why the delay given by the encoding unit 12b is half the delay given by the encoding unit 12a is that the capacity of the accumulating unit 22 increases as the time period T increases, where the capacity of the accumulating unit 22 is calculated by: time period T×1 Mbps ×10%.

The video low-quality stream receives higher assignment of the bit rate, which is 5 Mbps×10% in the present embodiment, than the audio low-quality stream, which is 1 Mbps×10%. If the data is accumulated with this rate for the time period T, the video accumulating unit would require a storage capacity five times that of the audio accumulating unit. As a result, the video high-quality stream is delayed by T/2, so that the amount of the low-quality stream to be accumulated in the receiving apparatuses is reduced as much.

The low- and high-quality streams for audio and video, with the high-quality streams being delayed, are output to the multiplexing unit 14 to be multiplexed into streams.

The multiplexing unit 14 multiplexes all the types of digital streams into one multiplexed stream, and outputs the generated multiplexed stream to the modulating unit 15.

Up to now, the construction and operation of the transmission apparatus in Embodiment 5 has been described. Now, the construction of the receiving apparatuses in Embodiment 5 will be described.

Figure 15:
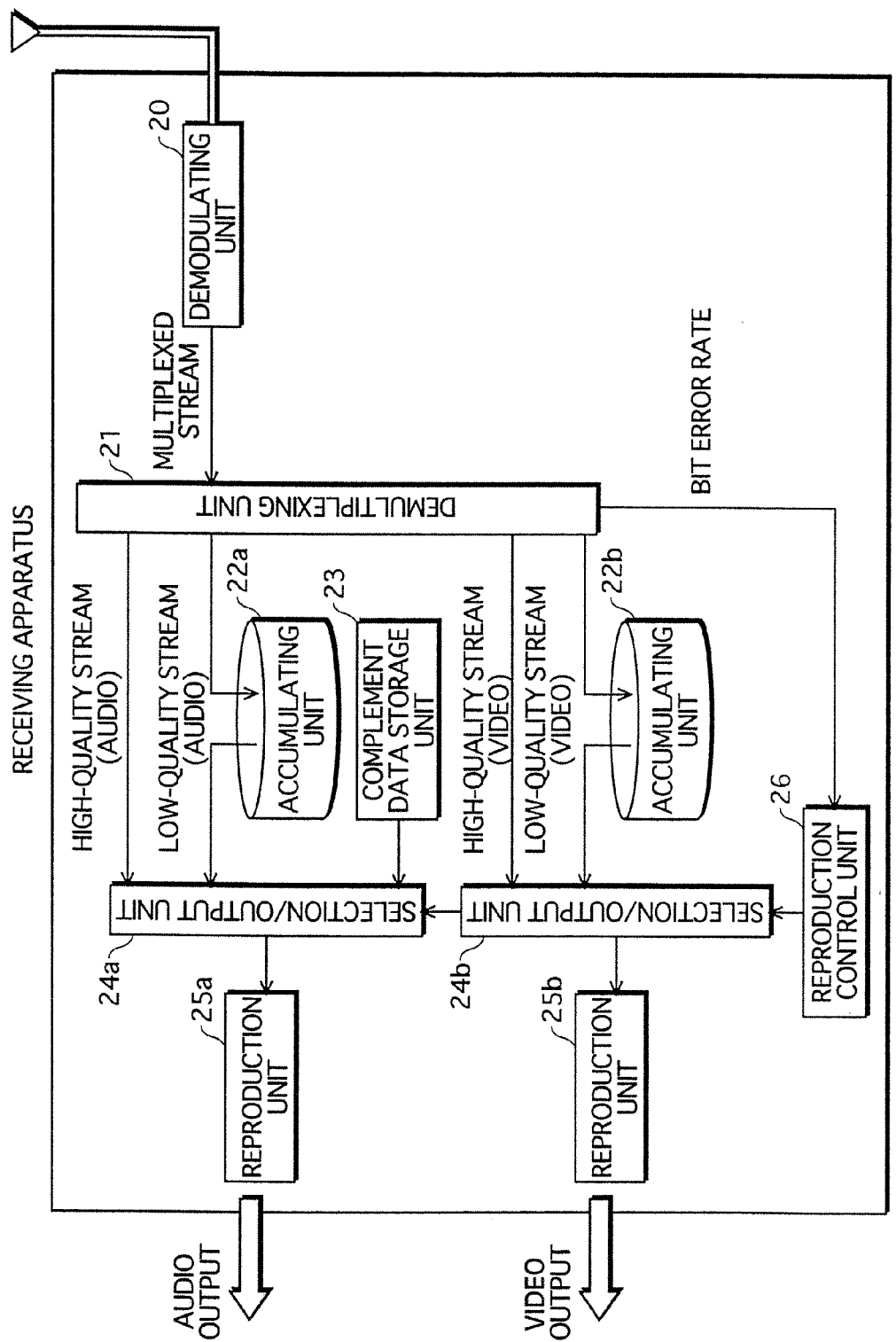
FIG. 15 shows the construction of the receiving apparatuses in Embodiment 5.

FIG. 15 shows the construction of the receiving apparatuses in Embodiment 5. In the receiving apparatuses in Embodiment 5, the accumulating unit 22, the selection/output unit 24, and the reproduction unit 25 are provided for each audio and video. More specifically, an accumulating unit 22a, a selection/output unit 24a, and a reproduction unit 25a deal with the low- and high-quality streams for audio, and an accumulating unit 22b, a selection/output unit 24b, and a reproduction unit 25b deal with the low- and high-quality streams for video.

The demultiplexing unit 21 demultiplexes a multiplexed stream to obtain four types of digital streams; an audio low-quality stream; a video low-quality stream; an audio high-quality stream; and a video high-quality stream.

The accumulating unit 22a accumulates part of the audio low-quality stream that has been obtained during a time period T until the current time.

The accumulating unit 22b accumulates part of the video low-quality stream that has been obtained during a time period T/2 until the current time.

The selection/output unit 24a selects one among (i) the audio high-quality stream output from the demultiplexing unit 21 and (ii) part of the audio low-quality stream accumulated in the accumulating unit 22a, and outputs the selected audio digital stream to the reproduction unit 25a.

The selection/output unit 24b selects one among (i) the video high-quality stream output from the demultiplexing unit 21 and (ii) part of the video low-quality stream accumulated in the accumulating unit 22b, and outputs the selected video digital stream to the reproduction unit 25b.

The reproduction unit 25a reproduces the audio digital stream output from the selection/output unit 24a.

The reproduction unit 25b reproduces the video digital stream output from the selection/output unit 24b.

The reproduction control unit 26 controls the output of the selection/output units 24a and 24b. The reproduction control unit 26 instructs the selection/output unit 24a to output the audio high-quality stream and the selection/output unit 24b to output the video high-quality stream while the multiplexed stream is normally received. The reproduction control unit 26 performs the reproduction control during the reception-interrupted period as follows, where it is supposed that the reception-interrupted period lasts for time period T.

During the first half (T/2) of the reception-interrupted period, the reproduction control unit 26 instructs the selection/output unit 24a to output the packets accumulated in the accumulating unit 22a, and instructs the selection/output unit 24b to output the packets accumulated in the accumulating unit 22b. Since the accumulating unit 22a accumulates part of the audio low-quality stream and the accumulating unit 22b accumulates part of the video low-quality stream, the audio low-quality stream and the video low-quality stream are reproduced during the first half (T/2) of the reception-interrupted period.

During the second half (T/2) of the reception-interrupted period, the reproduction control unit 26 instructs the selection/output unit 24a to output the packets accumulated in the accumulating unit 22a. However, since all the packets accumulated in the accumulating unit 22b, that is, part of the video low-quality stream has been reproduced during the first half (T/2) of the reception-interrupted period, only the audio low-quality stream is reproduced during the second half (T/2) of the reception-interrupted period.

As described above, according to the present embodiment, the "high-quality audio+high-quality video" output that is supplied during the normal reception period changes to the "low-quality audio+low-quality video" output if a failure occurs to the transmission path. Furthermore, if the time reception interruption continues for a certain time period, the reproduction changes from "audio+video" to "only audio". That is to say, the reproduced data changes step by step from the high-quality audio and video in the normal reception period to the low-quality audio and video, and to the only audio without video. In this way, the digital receiving apparatuses imitate the gradual deterioration of reproduction output that is observed in the analog receiving apparatuses when a transmission path failure occurs, giving an impression to the audiences that the reproduction quality is gradually degraded in the same manner as when they are listening to analog receivers.

Embodiment 6

The encoding units 11 and 12 in Embodiment 1 perform a fixed-bit-rate encoding. In Embodiment 6, the transmission apparatus performs a variable-length encoding.

Figure 16:
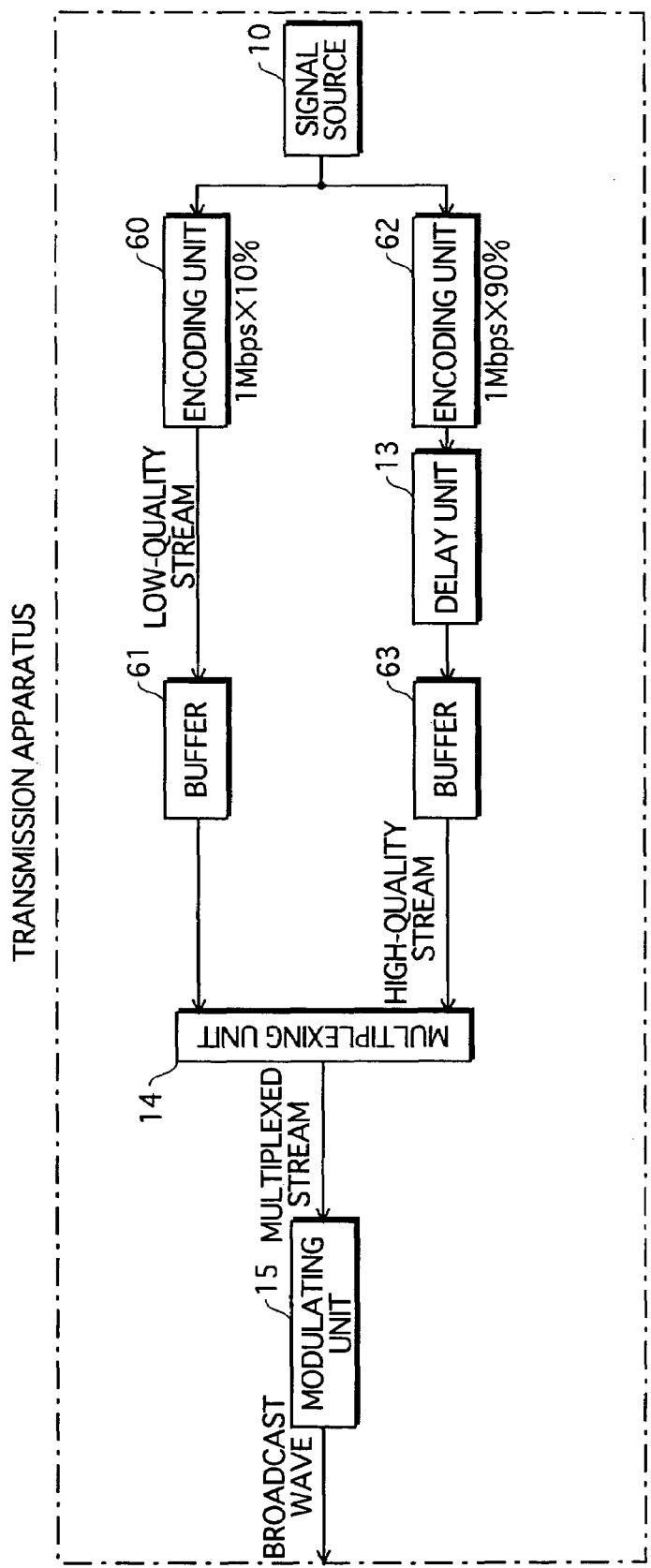
FIG. 16 shows the construction of a transmission apparatus in a broadcast system in Embodiment 6.

FIG. 16 shows the construction of a transmission apparatus in a broadcast system in Embodiment 6. In comparison with FIG. 1, FIG. 16 includes encoding units 60 and 62 respectively in place of the encoding units 11 and 12, and includes buffers 61 and 63 that respectively correspond to the encoding units 11 and 12.

The encoding unit 60 generates a low-quality stream by performing a variable-length encoding in which it assigns a variable-length bit rate to each audio frame.

The buffer 61 stores 30 seconds of audio frames among those constituting the low-quality stream generated by the encoding unit 60.

The encoding unit 62 generates a high-quality stream by performing a variable-length encoding in which it assigns a variable-length bit rate to each audio frame.

The buffer 63 stores 30 seconds of audio frames among those constituting the high-quality stream generated by the encoding unit 62.

The multiplexing unit 14 multiplexes the 30 seconds of audio frames stored in the buffer 61 with the 30 seconds of audio frames stored in the buffer 63 into one multiplexed stream, and outputs the multiplexed stream to the modulating unit 15. The modulating unit 15 outputs the multiplexed stream at 1 Mbps of the bit rate for one band.

Here, the variable-length encoding performed by the encoding units 60 and 62 will be described.

In the variable-length encoding, the encoding unit 60 (62) checks each section of an analog signal that corresponds to each audio frame and detects an amount of audible component the section contains, assigns a bit rate to each section in proportionate to the detected amount of audible component, and generates audio frames by encoding each section in accordance with the assigned bit rate. With this arrangement, as much amount of bit rate as omitted from the audio frames that contain less amounts of audible component can be appropriated to the audio frames that contain more amounts of audible component. This enables the quality of the audio reproduction to be improved in total.

The bit rate assigned to each audio frame by the encoding unit 60 is a part of the number of bits obtained by "1 Mbps×10%×30 seconds". That is to say, although the encoding unit 60 assigns a variable-length bit rate to each audio frame, the total bit rate for 30 seconds does not exceed "1 Mbps×10%".

Similarly, the bit rate assigned to each audio frame by the encoding unit 62 is a part of the number of bits obtained by "1 Mbps×90%×30 seconds". That is to say, although the encoding unit 62 assigns a variable-length bit rate to each audio frame, the total bit rate for 30 seconds does not exceed "1 Mbps×90%".

This is because the 30 seconds of audio frames stored in the buffer 61 and the 30 seconds of audio frames stored in the buffer 63, which are multiplexed together and output onto a transmission path, should not exceed 1 Mbps of the bit rate for one band.

As described above, the present embodiment enables the quality of the audio reproduction to be improved in total by assigning higher bit rates to the audio frames that contain more amounts of audible component, and assigning lower bit rates to the audio frames that contain less amounts of audible component.

It should be noted here that the time period of 30 seconds is only an example given for the sake of convenience, and it may be either increased or decreased.

Embodiment 7

In Embodiments 1 to 6, the signal source 10 generates an analog signal, and the encoding units 11 and 12 perform a quantization process with different numbers of quantization bits, so that two digital streams are transmitted at different bit rates on transmission paths. In Embodiment 7, the signal source 10 generates a digital signal. That is say, the signal source 10 generates a quantized digital signal and the encoding units 11 and 12 encode the quantized digital signal. In this encoding, the encoding amount in the encoding unit 11 is set to a larger value, and the encoding amount in the encoding unit 12 is set to a smaller value. It is possible to assign different bit rates to two digital streams for transmission only by adjusting the encoding amount as explained above. It is accordingly possible to use a digital signal source that has been encoded by MPEG and accumulated, as it is. This facilitates the broadcasting stations.

In the transmission apparatus in Embodiments 1-7, the delay unit 13 operates after the encoding unit 12. However, the delay unit 13 may operate before the encoding unit 12. That is to say, the delay unit 13 may delay the signal from the signal source 10 before the signal is input to the encoding unit 12.

The features of the transmission apparatus and the receiving apparatuses described in Embodiments 1-7 can be realized by a computer-readable program. Such a computer-readable program can be executed separately from the transmission apparatus and the receiving apparatuses. Also, such a program maybe recorded into a computer-readable recording medium, may be transferred or lent to other parties via the recording medium, and may be executed by the parties. Also, such a program may be distributed on a network and executed by the receivers.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A broadcast system including a transmission apparatus and a receiving apparatus, the transmission apparatus including:
   a generating unit operable to generate a first digital stream and a second digital stream by encoding a same signal at different encoding bit rates, where an encoding bit rate for the first digital stream is lower than an encoding bit rate for the second digital stream; and
   a transmission unit operable to transmit the first and second digital streams onto a transmission path while delaying the second digital stream relative to the first digital stream,
   the receiving apparatus including:
   a reproduction unit operable to reproduce the second digital stream in a normal state;
   a reproduction control unit operable to, when a transmission path failure occurs, cause the reproduction unit to reproduce, instead of the second digital stream, a portion of the first digital stream that has been received before the occurrence of the transmission path failure;

a receiving unit operable to receive packets constituting the first and second digital streams for each digital stream;

an accumulating unit operable to accumulate one or more packets of the first digital stream received by the receiving unit during a predetermined time period until a current time, wherein the predetermined time period is determined based on statistics of a time period for which a transmission path failure continues, and the reproduction control unit causes the reproduction unit to reproduce the one or more packets of the first digital stream accumulated in the accumulating unit, when a transmission path failure occurs; and a write control unit operable to, each time the receiving unit newly receives a packet, write the newly received packet into the accumulating unit after deleting an oldest packet among the one or more packets accumulated in the accumulating unit.

2. The broadcast system of claim 1, wherein the receiving apparatus is provided with a pilot lamp that emits light in a manner in which a normal state is distinguished from an abnormal state, wherein in the normal state, the second digital stream is reproduced, and in the abnormal state, the first digital stream is reproduced.

3. The broadcast system of claim 1, wherein when a transmission path failure continues exceeding the predetermined time period during which the one or more packets are accumulated in the accumulating unit, the receiving apparatus reproduces supplementary data so as to complement the reproduction of the accumulated packets.

4. The broadcast system of claim 1, wherein the generating unit of the transmission apparatus includes two encoders that respectively generate the first digital stream and the second digital stream by performing a variable-length encoding onto an analog signal.

5. A broadcast system including a transmission apparatus and a receiving apparatus, the transmission apparatus including:

a generating unit operable to generate a first digital stream and a second digital stream by encoding a same signal at different encoding bit rates, where an encoding bit rate for the first digital stream is lower than an encoding bit rate for the second digital stream; and a transmission unit operable to transmit the first and second digital streams onto a transmission path while delaying the second digital stream relative to the first digital stream, the receiving apparatus including:

a reproduction unit operable to reproduce the second digital stream in a normal state; and a reproduction control unit operable to, when a transmission path failure occurs, cause the reproduction unit to reproduce, instead of the second digital stream, a portion of the first digital stream that has been received before the occurrence of the transmission path failure, wherein the receiving apparatus superposes a signal resembling a noise on the portion of the first digital stream that is reproduced due to occurrence of a transmission path failure.

6. The receiving apparatus of claim 5, wherein the receiving apparatus further includes:

a receiving unit operable to receive packets constituting the first and second digital streams for each digital stream; and an accumulating unit operable to accumulate one or more packets of the first digital stream received by the receiving unit during a predetermined time period until a current time, wherein the reproduction control unit causes the reproduction unit to reproduce the one or more packets of the first digital stream accumulated in the accumulating unit, when a transmission path failure occurs.

7. The broadcast system of claim 6, wherein the predetermined time period is equal to a time period by which the second digital stream is delayed by the transmission unit.

8. The broadcast system of claim 6, wherein the receiving apparatus further includes a write control unit operable to, each time the receiving unit newly receives a packet, write the newly received packet into the accumulating unit after deleting an oldest packet among the one or more packets accumulated in the accumulating unit.

9. The broadcast system of claim 6, wherein when a transmission path failure continues exceeding the predetermined time period during which the one or more packets are accumulated in the accumulating unit, the receiving apparatus reproduces supplementary data so as to complement the reproduction of the accumulated packets.

10. The broadcast system of claim 5, wherein the generating unit of the transmission apparatus includes two encoders that respectively generate the first digital stream and the second digital stream by performing a variable-length encoding onto an analog signal.

11. The broadcast system of claim 5, wherein the receiving apparatus is provided with a pilot lamp that emits light in a manner in which a normal state is distinguished from an abnormal state, wherein in the normal state, the second digital stream is reproduced, and in the abnormal state, the first digital stream is reproduced.

12. A broadcast system including a transmission apparatus and a receiving apparatus, the transmission apparatus including:

a generating unit operable to generate a first digital stream and a second digital stream by encoding a same signal at different encoding bit rates, where an encoding bit rate for the first digital stream is lower than an encoding bit rate for the second digital stream; and a transmission unit operable to transmit the first and second digital streams onto a transmission path while delaying the second digital stream relative to the first digital stream, the receiving apparatus including:

an accumulating unit operable to accumulate one or more packets of the first digital stream received during a predetermined time period until a current time, wherein the predetermined time period is determined based on statistics of a time period for which a transmission path failure continues;

a reproduction unit operable to reproduce the second digital stream in a normal state;

a reproduction control unit operable to, when a transmission path failure occurs, cause the reproduction unit to reproduce, instead of the second digital stream, a portion of the first digital stream that has been received before the occurrence of the transmission path failure;

an operation receiving unit operable to receive input of an operation by a user to request real time reproduction; and a switch unit operable to switch from reproduction of the second digital stream to reproduction of the first digital stream when the operation receiving unit receives the input of the operation by the user.

13. The broadcast system of claim 12, wherein the generating unit of the transmission apparatus includes two encoders that respectively generate the first digital stream and the second digital stream by performing a variable-length encoding onto an analog signal.

14. The broadcast system of claim 12 wherein the receiving apparatus superposes a signal resembling a noise on the one or more packets accumulated in the accumulating unit when the one or more packets are reproduced due to occurrence of a transmission path failure.

15. A receiving apparatus for use in a broadcast system including a transmission apparatus that generates a first digital stream and a second digital stream by encoding a same signal at different encoding bit rates, where an encoding bit rate for the first digital stream is lower than an encoding bit rate for the second digital steam, and transmits the first and second digital streams onto a transmission path while delaying the second digital stream relative to the first digital stream, the receiving apparatus comprising:

a reproduction unit operable to reproduce the second digital stream in a normal state;

a reproduction control unit operable to, when a transmission path failure occurs, cause the reproduction unit to reproduce, instead of the second digital stream, a portion of the first digital stream that has been received before the occurrence of the transmission path failure;

a receiving unit operable to receive packets constituting the first and second digital streams for each digital stream; and an accumulating unit operable to accumulate one or more packets of the first digital stream received by the receiving unit during a predetermined time period until a current time, wherein the predetermined time period is determined based on statistics of a time period for which a transmission path failure continues, and the reproduction control unit causes the reproduction unit to reproduce the one or more packets of the first digital stream accumulated in the accumulating unit, when a transmission path failure occurs; and a write control unit operable to, each time the receiving unit newly receives a packet, write the newly received packet into the accumulating unit after deleting an oldest packet among the one or more packets accumulated in the accumulating unit.

16. The receiving apparatus of claim 15, wherein the receiving apparatus is provided with a pilot lamp that emits light in a manner in which a normal state is distinguished from an abnormal state, wherein in the normal state, the second digital stream is reproduced with delay, and in the abnormal state, the first digital stream is reproduced without delay.

17. The receiving apparatus of claim 15, wherein if when a transmission path failure continues exceeding the predetermined time period during which the one or more packets are accumulated in the accumulating unit, the receiving apparatus reproduces supplementary data so as to complement the reproduction of the accumulated packets.

18. A receiving apparatus for use in a broadcast system including a transmission apparatus that generates a first digital stream and a second digital stream by encoding a same signal at different encoding bit rates, where an encoding bit rate for the first digital stream is lower than an encoding bit rate for the second digital stream, and transmits the first and second digital streams onto a transmission path while delaying the second digital stream relative to the first digital stream, the receiving apparatus comprising:

a reproduction unit operable to reproduce the second digital stream in a normal state; and a reproduction control unit operable to, when a transmission path failure occurs, cause the reproduction unit to reproduce, instead of the second digital stream, a portion of the first digital stream that has been received before the occurrence of the transmission path failure, wherein the receiving apparatus superposes a signal resembling a noise on the one or more packets accumulated in the accumulating unit when the one or more packets are reproduced due to occurrence of a transmission path failure.

19. The receiving apparatus of claim 18 further comprising:

a receiving unit operable to receive packets constituting the first and second digital streams for each digital stream; and an accumulating unit operable to accumulate one or more packets of the first digital stream received by the receiving unit during a predetermined time period until a current time, wherein the reproduction control unit causes the reproduction unit to reproduce the one or more packets of the first digital stream accumulated in the accumulating unit, when a transmission path failure occurs.

20. The receiving apparatus of claim 19, wherein the predetermined time period is equal to a time period by which the second digital stream is delayed by the transmission apparatus.

21. The receiving apparatus of claim 19 further comprising a write control unit operable to, each time the receiving unit newly receives a packet, write the newly received packet into the accumulating unit after deleting an oldest packet among the one or more packets accumulated in the accumulating unit.

22. The receiving apparatus of claim 18, wherein the receiving apparatus is provided with a pilot lamp that emits light in a manner in which a normal state is distinguished from an abnormal state, wherein in the normal state, the second digital stream is reproduced with delay, and in the abnormal state, the first digital stream is reproduced without delay.

23. The receiving apparatus of claim 18, wherein when a transmission path failure continues exceeding the predetermined time period during which the one or more packets are accumulated in the accumulating unit, the receiving apparatus reproduces supplementary data so as to complement the reproduction of the accumulated packets.

24. A receiving apparatus for use in a broadcast system including a transmission apparatus that generates a first digital stream and a second digital stream by encoding a same signal at different encoding bit rates, where an encoding bit rate for the first digital stream is lower than an encoding bit rate for the second digital stream, and transmits the first and second digital streams onto a transmission path while delaying the second digital stream relative to the first digital stream, the receiving apparatus comprising:
- a receiving unit operable to receive packets constituting the first and second digital streams for each digital stream;
- an accumulating unit operable to accumulate one or more packets of the first digital stream received by the receiving unit during a predetermined time period until a current time, wherein the predetermined time period is determined based on statistics of a time period for which a transmission path failure continues;
- a reproduction unit operable to reproduce the second digital stream in a normal state;
- a reproduction control unit operable to, when a transmission path failure occurs, cause the reproduction unit to reproduce, instead of the second digital stream, a portion of the first digital stream that has been received before the occurrence of the transmission path failure,
- an operation receiving unit operable to receive input of an operation by a user to request real time reproduction; and
- a switch unit operable to switch from reproduction of the second digital stream to reproduction of the first digital stream when the operation receiving unit receives the input of the operation by the user.

25. The receiving apparatus of claim 24, wherein the receiving apparatus superposes a signal resembling a noise on the one or more packets accumulated in the accumulating unit when the one or more packets are reproduced due to occurrence of a transmission path failure.

* * * * *

UNITED STATES PATENT AND TRADEMARK OFFICE
CERTIFICATE OF CORRECTION

PATENT NO. : 7,286,601 B2  Page 1 of 1
APPLICATION NO. : 10/641360
DATED : October 23, 2007
INVENTOR(S) : Kitamura It is certified that error appears in the above-identified patent and that said Letters Patent is hereby corrected as shown below:

In Claim 17, Column 19, line 61, "if" should be deleted.

Signed and Sealed this

Eighteenth Day of March, 2008

JON W. DUDAS
*Director of the United States Patent and Trademark Office*